United States Patent
Shao et al.

(10) Patent No.: US 11,032,778 B2
(45) Date of Patent: Jun. 8, 2021

(54) UPLINK CHANNEL POWER ALLOCATION METHOD AND APPARATUS

(71) Applicant: Huawei Technologies Co., Ltd., Shenzhen (CN)

(72) Inventors: Jiafeng Shao, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/517,272

(22) Filed: Jul. 19, 2019

(65) Prior Publication Data

US 2019/0342839 A1 Nov. 7, 2019

Related U.S. Application Data

(63) Continuation of application No. PCT/CN2018/073391, filed on Jan. 19, 2018.

(30) Foreign Application Priority Data

Jan. 22, 2017 (CN) .......................... 201710047415.8

(51) Int. Cl.
*H04W 52/28* (2009.01)
*H04W 52/14* (2009.01)
(Continued)

(52) U.S. Cl.
CPC ......... *H04W 52/146* (2013.01); *H04L 1/1861* (2013.01); *H04L 5/0055* (2013.01);
(Continued)

(58) Field of Classification Search
CPC ............. H04W 52/146; H04W 52/346; H04W 52/281; H04W 72/10; H04W 72/0473; H04W 52/14; H04L 5/0055; H04L 1/1861
See application file for complete search history.

(56) References Cited

U.S. PATENT DOCUMENTS

| 2005/0208960 | A1 | 9/2005 | Hassan |
| 2013/0058315 | A1* | 3/2013 | Feuersanger ....... H04W 52/346 370/336 |

(Continued)

FOREIGN PATENT DOCUMENTS

| CN | 1914835 A | 2/2007 |
| CN | 103200663 A | 7/2013 |

(Continued)

OTHER PUBLICATIONS

NPL-1 (Guangdong OPPO Mobile Telecom: Uplink power control for NR, Jan. 2017) (Year: 2017).*

(Continued)

*Primary Examiner* — Dong-Chang Shiue
(74) *Attorney, Agent, or Firm* — Slater Matsil, LLP

(57) ABSTRACT

Embodiments of this application disclose an uplink channel power allocation method, including: determining, by a terminal device, priorities of N uplink channels based on a service set corresponding to each of the N uplink channels in a first time period, where each service set is corresponding to one priority, and at least one of service sets corresponding to the N uplink channels includes at least one service; and allocating, by the terminal device, transmit power to at least one of the N uplink channels based on the priorities of the N uplink channels.

20 Claims, 9 Drawing Sheets

(51) Int. Cl.
*H04L 1/18* (2006.01)
*H04L 5/00* (2006.01)
*H04W 52/34* (2009.01)
*H04W 72/04* (2009.01)
*H04W 72/10* (2009.01)

(52) U.S. Cl.
CPC ....... *H04W 52/281* (2013.01); *H04W 52/346* (2013.01); *H04W 72/0473* (2013.01); *H04W 72/10* (2013.01)

(56) References Cited

U.S. PATENT DOCUMENTS

| | | | |
|---|---|---|---|
| 2014/0321389 A1 | 10/2014 | Zhang et al. | |
| 2015/0189675 A1 | 7/2015 | Feuersaenger et al. | |
| 2018/0176871 A1 | 6/2018 | Li et al. | |
| 2019/0253983 A1 | 8/2019 | Feuersaenger et al. | |
| 2019/0342839 A1* | 11/2019 | Shao | H04L 1/1861 |

FOREIGN PATENT DOCUMENTS

| | | |
|---|---|---|
| CN | 104780016 A | 7/2015 |
| CN | 104936297 A | 9/2015 |
| CN | 106341895 A | 1/2017 |
| EP | 2637456 A2 | 9/2013 |
| EP | 2793514 A1 | 10/2014 |
| JP | 2013529403 A | 7/2013 |
| KR | 20130024895 A | 3/2013 |

OTHER PUBLICATIONS

NPL-2 (Huawei, Access control in NR, 3GPP TSG-RAN WG2 Meeting Ad Hoc, Jan. 20, 2017) (Year: 2017).*
Guangdong OPPO Mobile Telecom, "Uplink power control for NR", 3GPP Draft RAN WG1 NR-Adhoc, R1-1700553, Spokane, USA, Jan. 16, 2017-Jan. 20, 2017, Jan. 16, 2017, XP051208083, 2 pages.
Huawei et al., "Access control in NR", 3GPP Draft RAN WG2, R2-1700095, Spokane, USA; Jan. 16, 2017-Jan. 20, 2017, Jan. 17, 2017, XP051210681, 4 pages.

* cited by examiner

UPLINK CHANNEL POWER ALLOCATION METHOD AND APPARATUS

CROSS-REFERENCE TO RELATED APPLICATIONS

This application is continuation of International Application No. PCT/CN2018/073391, filed on Jan. 19, 2018, which claims priority to Chinese Patent Application No. 201710047415.8, filed on Jan. 22, 2017. The disclosures of the aforementioned applications are hereby incorporated by reference in their entireties.

TECHNICAL FIELD

Embodiments of this application relate to the field of communications technologies, and more specifically, to an uplink channel power allocation method and an apparatus.

BACKGROUND

In a fifth-generation mobile radio technology system, there are a plurality of service types, and each service type is corresponding to a different service requirement. For example, an ultra-reliable and low latency communications (URLLC) service requires a low latency and high reliability, that is, transmission needs to succeed within 1 ms. For another example, an enhanced mobile broadband (eMBB) service requires high spectrum efficiency, but has no requirement for a latency. For still another example, a massive machine-type communications (mMTC) service requires periodic and low-power sending.

In the fifth-generation mobile radio technology system, an uplink channel power allocation method has not been formulated. When a sum of transmit power required by all uplink channels of a terminal device is greater than maximum allowable transmit power of the terminal device, currently, there is no proper power allocation method to effectively allocate transmit power to an uplink channel. Therefore, there is a technical requirement for effectively allocating transmit power to an uplink channel.

Therefore, how to effectively allocate transmit power to an uplink channel is an urgent problem that needs to be resolved at present.

SUMMARY

Embodiments of this application provide an uplink channel power allocation method and an apparatus.

The embodiments of this application are implemented as follows. According to a first aspect, an embodiment of this application provides an uplink channel power allocation method, to effectively allocate transmit power to an uplink channel. The method includes: determining, by a terminal device, priorities of N uplink channels based on a service set corresponding to each of the N uplink channels in a first time period, where each service set is corresponding to one priority, and at least one of service sets corresponding to the N uplink channels includes at least one service; and allocating, by the terminal device, transmit power to at least one of the N uplink channels based on the priorities of the N uplink channels, where N is greater than or equal to 2.

In this embodiment of this application, a priority of an uplink channel may be determined based on a priority of a service set corresponding to the uplink channel. Because a priority of an important service set is high, the terminal device may preferably allocate, based on an order of the priorities of the N uplink channels, transmit power to at least one uplink channel corresponding to the important service set, to ensure that transmit power is preferably allocated to an uplink channel corresponding to the important service set, thereby meeting a service requirement of a service set.

In a possible implementation, the determining, by a terminal device, priorities of N uplink channels based on a service set corresponding to each of the N uplink channels in a first time period includes: if a sum of transmit power of the N uplink channels in the first time period is greater than a specified power threshold, determining, by the terminal device, the priorities of the N uplink channels based on the service set corresponding to each of the N uplink channels in the first time period.

In this embodiment of this application, when the sum of the transmit power of the N uplink channels in the first time period is greater than the specified power threshold, the terminal device considers preferably allocating transmit power to an uplink channel corresponding to an important service set.

In a possible implementation, before the determining priorities of N uplink channels, the method further includes: determining, by the terminal device, the service set corresponding to each of the N uplink channels.

After the terminal device determines the service set corresponding to each of the N uplink channels, the terminal device can determine the priorities of the N uplink channels based on the service set corresponding to each of the N uplink channels in the first time period.

Optionally, the determining, by the terminal device, the service set corresponding to each of the N uplink channels specifically includes: determining, by the terminal device based on received higher layer signaling, the service set corresponding to each of the N uplink channels.

Optionally, the determining, by the terminal device based on received higher layer signaling, the service set corresponding to each of the N uplink channels specifically includes: determining, by the terminal device based on higher layer signaling or physical layer signaling sent by a network device, the service set corresponding to each of the N uplink channels.

Optionally, the determining, by the terminal device based on received higher layer signaling, the service set corresponding to each of the N uplink channels specifically includes: determining, by the terminal device based on higher layer signaling sent by an upper-layer protocol layer of the terminal device to a physical layer of the terminal device, the service set corresponding to each of the N uplink channels, where the upper-layer protocol layer is at least one protocol layer of each protocol layer above the physical layer.

Optionally, the determining, by the terminal device, the service set corresponding to each of the N uplink channels specifically includes: determining, by the terminal device based on predefined information, the service set corresponding to each of the N uplink channels.

In a possible implementation, the determining, by a terminal device, priorities of N uplink channels based on a service set corresponding to each of the N uplink channels in a first time period includes: determining, by the terminal device, the priority of each service set; and determining, by the terminal device, the priorities of the N uplink channels based on a priority of the service set corresponding to each of the N uplink channels in the first time period.

After determining the priority of each service set, the terminal device may determine the priorities of the N uplink channels based on the priority of the service set corresponding to each of the N uplink channels in the first time period.

Optionally, the determining, by the terminal device, the priority of each service set specifically includes: determining, by the terminal device, the priority of each service set based on received higher layer signaling.

Optionally, the determining, by the terminal device, the priority of each service set based on received higher layer signaling specifically includes: determining, by the terminal device, the priority of each service set based on higher layer signaling or physical layer signaling sent by a network device.

Optionally, the determining, by the terminal device, the priority of each service set based on received higher layer signaling specifically includes: determining, by the terminal device, the priority of each service set based on higher layer signaling sent by an upper-layer protocol layer of the terminal device to a physical layer of the terminal device, where the upper-layer protocol layer is at least one protocol layer of each protocol layer above the physical layer.

Optionally, the determining, by the terminal device, the priority of each service set specifically includes: determining, by the terminal device, the priority of each service set based on predefined information.

In a possible implementation, the determining, by a terminal device, priorities of N uplink channels based on a service set corresponding to each of the N uplink channels in a first time period includes: when L uplink channels in the N uplink channels are corresponding to a same service set, determining, by the terminal device, priorities of the L uplink channels according to a principle specified for the same service set, where N is greater than or equal to L, and L is greater than or equal to 2.

When the L uplink channels in the N uplink channels are corresponding to the same service set, the terminal device may determine the priorities of the L uplink channels according to the principle specified for the same service set, so that the terminal device allocates transmit power to at least one of the L uplink channels based on the priorities of the L uplink channels, to preferably allocate transmit power to an important uplink channel.

In a possible implementation, before the determining, by the terminal device, priorities of the L uplink channels according to a principle specified for the same service set, the method further includes: determining, by the terminal device, the principle specified for the same service set.

The terminal device specifies the principle for the same service set. Therefore, when the L uplink channels in the N uplink channels are corresponding to the same service set, the terminal device may first determine the principle specified for the same service set, and then determine the priorities of the L uplink channels according to the principle.

Optionally, the determining, by the terminal device, the principle specified for the same service set specifically includes: determining, by the terminal device based on information included in the same service set, the principle designed for the same service set.

Optionally, the determining, by the terminal device, the principle specified for the same service set specifically includes: determining, by the terminal device based on higher layer signaling or physical layer signaling sent by a network device, the principle specified for the same service set.

Optionally, the determining, by the terminal device, the principle specified for the same service set specifically includes: determining, by the terminal device based on first higher layer signaling sent by an upper-layer protocol layer of the terminal device to a physical layer of the terminal device, the principle specified for the same service set, where the upper-layer protocol layer is at least one protocol layer of each protocol layer above the physical layer.

Optionally, the determining, by the terminal device, the principle specified for the same service set specifically includes: determining, by the terminal device based on predefined information, the principle specified for the same service set.

In a possible implementation, the principle is corresponding to at least one of the following: an information transmission deadline corresponding to an uplink channel, an information transmission latency requirement corresponding to an uplink channel, a quantity of remaining hybrid automatic repeat request HARQ transmission times of a HARQ process corresponding to an uplink channel, a spacing of a subcarrier on which an uplink channel is located, a length of a slot in which an uplink channel is located, a length of a mini-slot in which an uplink channel is located, and an information sending period corresponding to an uplink channel.

In a possible implementation, the service set includes at least one of a first service set, a second service set, a third service set, and a fourth service set. The first service set includes an ultra-reliable and low latency communications URLLC service, the second service set includes an enhanced mobile broadband eMBB service, the third service set includes a massive machine-type communications mMTC service, and the fourth service set includes at least one of channel state information CSI, a HARQ, and a scheduling request SR. When the same service set is the first service set, the principle is corresponding to the information transmission deadline corresponding to the uplink channel, the information transmission latency requirement corresponding to the uplink channel, the length of the slot in which the uplink channel is located, or the length of the mini-slot in which the uplink channel is located; and/or when the same service set is the second service set, the principle is corresponding to the quantity of remaining hybrid automatic repeat request HARQ transmission times of the HARQ process corresponding to the uplink channel, the spacing of the subcarrier on which the uplink channel is located, the length of the slot in which the uplink channel is located, or the length of the mini-slot in which the uplink channel is located; and/or when the same service set is the third service set, the principle is corresponding to the information sending period corresponding to the uplink channel, the spacing of the subcarrier on which the uplink channel is located, the length of the slot in which the uplink channel is located, or the length of the mini-slot in which the uplink channel is located; and/or when the same service set is the fourth service set, the principle is corresponding to the information sending period corresponding to the uplink channel, the spacing of the subcarrier on which the uplink channel is located, the length of the slot in which the uplink channel is located, or the length of the mini-slot in which the uplink channel is located.

The first service set includes the URLLC service. When the L uplink channels in the N uplink channels are corresponding to the first service set, the terminal device determines the priorities of the L uplink channels based on the information transmission deadline corresponding to the uplink channel, the information transmission latency requirement corresponding to the uplink channel, the length of the slot in which the uplink channel is located, or the length of the mini-slot in which the uplink channel is located, so that transmit power is preferably transmitted to an uplink channel corresponding to a latency-critical service.

The second service set includes the eMBB service. When the L uplink channels in the N uplink channels are corresponding to the second service set, the terminal device determines the priorities of the L uplink channels based on the quantity of remaining HARQ transmission times of the HARQ process corresponding to the uplink channel, the spacing of the subcarrier on which the uplink channel is located, the length of the slot in which the uplink channel is located, or the length of the mini-slot in which the uplink channel is located, so that transmit power is preferably transmitted to an uplink channel corresponding to an important service or a latency-sensitive service.

The third service set includes the mMTC service. When the L uplink channels in the N uplink channels are corresponding to the third service set, the terminal device determines the priorities of the L uplink channels based on the information sending period corresponding to the uplink channel, the spacing of the subcarrier on which the uplink channel is located, the length of the slot in which the uplink channel is located, or the length of the mini-slot in which the uplink channel is located, so that transmit power is preferably transmitted to an uplink channel corresponding to a relatively important mMTC service.

The fourth service set includes the CSI. When the L uplink channels in the N uplink channels are corresponding to the fourth service set, the terminal device determines the priorities of the L uplink channels based on the information sending period corresponding to the uplink channel, the spacing of the subcarrier on which the uplink channel is located, the length of the slot in which the uplink channel is located, or the length of the mini-slot in which the uplink channel is located, so that transmit power is preferably transmitted to an uplink channel corresponding to critical CSI.

In a possible implementation, the principle is at least one of the following: for information transmission of the same service set, an earlier information transmission deadline corresponding to an uplink channel indicates a higher priority of the uplink channel; for information transmission of the same service set, a requirement of an uplink channel for a lower information transmission latency indicates a higher priority of the uplink channel; for information transmission of the same service set, a smaller quantity of remaining HARQ transmission times of a HARQ process corresponding to an uplink channel indicates a higher priority of the uplink channel; for information transmission of the same service set, a larger spacing of a subcarrier on which an uplink channel is located indicates a higher priority of the uplink channel; for information transmission of the same service set, a shorter length of a slot in which an uplink channel is located indicates a higher priority of the uplink channel; for information transmission of the same service set, a shorter length of a mini-slot in which an uplink channel is located indicates a higher priority of the uplink channel; and for information transmission of the same service set, a shorter information sending period corresponding to an uplink channel indicates a higher priority of the uplink channel.

For information transmission of the same service set, if an information transmission deadline corresponding to an uplink channel is earlier, or an uplink channel requires a lower information transmission latency, or a quantity of remaining hybrid automatic repeat request HARQ transmission times of a HARQ process corresponding to an uplink channel is smaller, or a spacing of a subcarrier on which an uplink channel is located is larger, or a length of a slot in which an uplink channel is located is shorter, or a length of a mini-slot in which an uplink channel is located is shorter, or an information sending period corresponding to an uplink channel is shorter, it indicates that a chance of successfully sending the uplink channel is slighter and a requirement for sending the uplink channel is more critical. Therefore, a priority of the uplink channel is higher.

In a possible implementation, one or more physical random access channels PRACHs are further included in the first time period; before the determining priorities of N uplink channels, the method further includes: allocating, by the terminal device, transmit power to at least one of the PRACHs; and the allocating transmit power to at least one of the N uplink channels includes: allocating the transmit power to the at least one of the N uplink channels by using transmit power remaining after the allocation to the at least one PRACH.

If there is a PRACH in the first time period, it indicates that the terminal device cannot communicate with the network device normally. Therefore, the terminal device needs to preferably allocate the transmit power to the at least one of the PRACHs. After the transmit power is allocated to the at least one of the PRACHs, if the terminal device has remaining transmit power, the terminal device allocates the transmit power to the at least one of the N uplink channels by using the transmit power remaining after the allocation to the at least one PRACH, to ensure that transmit power is preferably allocated to a PRACH in the first time period.

In a possible implementation, the allocating, by the terminal device, transmit power to at least one of the PRACHs includes: determining, by the terminal device, a priority of a PRACH based on a service set corresponding to each PRACH; and allocating, by the terminal device, the transmit power to the at least one of the PRACHs based on the priority of the PRACH.

Each service set is corresponding to one priority. If a PRACH is corresponding to a service set, the terminal device determines a priority of the PRACH based on the service set corresponding to each PRACH, and then allocates the transmit power to the at least one of the PRACHs based on the priority of the PRACH, to ensure that transmit power is preferably allocated to a PRACH in the first time period.

In a possible implementation, the allocating, by the terminal device, transmit power to at least one of the PRACHs includes: determining, by the terminal device, a priority of a PRACH based on a length of a sequence or a length of a slot corresponding to each PRACH, where a length of each sequence or a length of each slot is corresponding to one priority; and allocating, by the terminal device, the transmit power to the at least one of the PRACHs based on the priority of the PRACH.

The length of the sequence or the length of the slot corresponding to each PRACH is corresponding to one priority. The terminal device may determine a priority of a PRACH based on the length of the sequence or the length of the slot corresponding to each PRACH, and then allocate the transmit power to the at least one of the PRACHs based on the priority of the PRACH, to ensure that transmit power is preferably allocated to a PRACH in the first time period.

In a possible implementation, the uplink channel is an uplink channel except a PRACH, or the uplink channel is an uplink data channel.

In a possible implementation, the service set includes the at least one of the first service set, the second service set, the third service set, and the fourth service set. The first service set includes the ultra-reliable and low latency communications URLLC service, the second service set includes the enhanced mobile broadband eMBB service, the third service set includes the massive machine-type communications mMTC service, and the fourth service set includes the at least one of the CSI, the HARQ, and the SR.

The service set not only may include the at least one of the first service set, the second service set, the third service set, and the fourth service set, but also may include another service set.

In a possible implementation, a priority corresponding to the first service set is higher than a priority corresponding to the second service set, and the priority corresponding to the first service set is higher than a priority corresponding to the third service set.

In a possible implementation, the priority corresponding to the second service set is higher than the priority corresponding to the third service set.

In a possible implementation, the priority corresponding to the first service set is higher than a priority corresponding to the fourth service set.

In a possible implementation, the priority corresponding to the third service set is higher than the priority corresponding to the fourth service set.

The priority corresponding to the second service set may be higher than the priority corresponding to the third service set, the priority corresponding to the second service set may be equal to the priority corresponding to the third service set, or the priority corresponding to the third service set may be higher than the priority corresponding to the second service set.

In a possible implementation, the priority corresponding to the first service set is higher than the priority corresponding to the fourth service set, and the priority corresponding to the fourth service set is higher than the priority corresponding to the second service set.

According to a second aspect, an embodiment of this application provides another uplink channel power allocation method, to ensure that transmit power is preferably allocated to a PRACH corresponding to an important service set. The method includes: determining, by a terminal device, priorities of N PRACHs based on a service set corresponding to each of the N PRACHs in a first time period, where each service set is corresponding to one priority, and at least one of service sets corresponding to N PRACHs includes at least one service; and allocating transmit power to at least one of the N PRACHs based on the priorities of the N PRACHs, where N is greater than or equal to 2.

In this embodiment of this application, a priority of the PRACHs may be determined based on a priority of a service set corresponding to a PRACH. Because a priority of an important service set is high, the terminal device may preferably allocate, based on an order of the priorities of the N PRACHs, transmit power to at least one PRACH corresponding to the important service set, to ensure that transmit power is preferably allocated to a PRACH corresponding to the important service set, thereby meeting a service requirement of a service set.

In a possible implementation, the determining, by a terminal device, priorities of N PRACHs based on a service set corresponding to each of the N PRACHs in a first time period includes: if a sum of transmit power of the N PRACHs is greater than a specified power threshold, determining, by the terminal device, a priority of a PRACH based on the service set corresponding to each of the N PRACHs in the first time period.

In this embodiment of this application, when the sum of the transmit power of the N PRACHs in the first time period is greater than the specified power threshold, the terminal device considers preferably allocating transmit power to a PRACH corresponding to an important service set.

In a possible implementation, before the determining priorities of N PRACHs, the method further includes: determining, by the terminal device, the service set corresponding to each of the N PRACHs in the first time period.

After the terminal device determines the service set corresponding to each of the N PRACHs, the terminal device can determine the priorities of the N PRACHs based on the service set corresponding to each of the N PRACHs in the first time period.

In a possible implementation, the determining, by a terminal device, priorities of N PRACHs based on a service set corresponding to each of the N PRACHs in a first time period includes: determining, by the terminal device, the priority of each service set; and determining, by the terminal device, the priorities of the N PRACHs based on a priority of the service set corresponding to each of the N PRACHs in the first time period.

The terminal device prestores the priority of each service set. Therefore, after determining the priority of each service set, the terminal device may determine the priorities of the N PRACHs based on the priority of the service set corresponding to each of the N PRACHs in the first time period.

In a possible implementation, the determining, by a terminal device, priorities of N PRACHs based on a service set corresponding to each of the N PRACHs in a first time period includes: when L PRACHs in the N PRACHs are corresponding to a same service set, determining, by the terminal device, priorities of the L PRACHs according to a principle specified for the same service set, where L is greater than or equal to 2.

The terminal device prestores the principle specified for the same service set. Therefore, when the L PRACHs in the N PRACHs are corresponding to the same service set, the terminal device may determine the priorities of the L PRACHs according to the prestored principle specified for the same service set, so that the terminal device allocates transmit power to at least one of the L PRACHs based on the priorities of the L PRACHs, to preferably allocate transmit power to a PRACH corresponding to an important service set.

In a possible implementation, before the determining priorities of N PRACHs, the method further includes: determining, by the terminal device, the principle specified for the same service set.

The terminal device prestores the principle specified for the same service set. Therefore, when the L PRACHs in the N PRACHs are corresponding to the same service set, the terminal device may first determine the principle specified for the same service set, and then determine the priorities of the L PRACHs according to the principle.

In a possible implementation, the principle is corresponding to at least one of the following: a length of a sequence corresponding to a PRACH, a length of a slot corresponding to a PRACH, and a length of a mini-slot corresponding to a PRACH.

In a possible implementation, the principle is at least one of the following: for information transmission of the same service set, a shorter length of a sequence corresponding to a PRACH indicates a higher priority of the PRACH; and for information transmission of the same service set, a shorter length of a slot corresponding to a PRACH indicates a higher priority of the PRACH.

For information transmission of the same service set, if a length of a sequence corresponding to a PRACH is shorter, or a length of a slot corresponding to a PRACH is shorter, it indicates that a chance of successfully sending the PRACH is slighter and a requirement for sending the PRACH is more critical. Therefore, a priority of the PRACH is higher.

According to a third aspect, an embodiment of this application provides still another uplink channel power allocation method, to ensure that transmit power is preferably allocated to at least one PRACH with a high priority in a first time period. The method includes: determining, by a terminal device, priorities of N PRACHs based on a length of a sequence or a length of a slot or a length of a mini-slot corresponding to each of the N PRACHs in a first time period, where a length of each sequence or a length of each slot is corresponding to one priority; and allocating transmit power to at least one of the N PRACHs based on the priorities of the N PRACHs, where N is greater than or equal to 2.

The length of each sequence or the length of each slot is corresponding to one priority. The terminal device may determine the priorities of the N PRACHs based on lengths of sequences or lengths of slots or lengths of mini-slots corresponding to the N PRACHs, and then allocate the transmit power to the at least one of the N PRACHs based on the priorities of the N PRACHs, to ensure that transmit power is preferably allocated to at least one PRACH with a high priority in the first time period.

In a possible implementation, the determining, by a terminal device, priorities of N PRACHs based on a length of a sequence or a length of a slot or a length of a mini-slot corresponding to each of the N PRACHs in a first time period includes: if a sum of transmit power of the N PRACHs is greater than a specified power threshold, determining, by the terminal device, a priority of a PRACH based on the length of the sequence or the length of the slot or the length of the mini-slot corresponding to each of the N PRACHs in the first time period.

In this embodiment of this application, when the sum of the transmit power of the N PRACHs in the first time period is greater than the specified power threshold, the terminal device determines a priority of a PRACH based on a length of a sequence or a length of a slot or a length of a mini-slot.

In a possible implementation, before the determining priorities of N PRACHs, the method further includes: determining, by the terminal device, the length of the sequence or the length of the slot or the length of the mini-slot corresponding to each of the N PRACHs in the first time period.

After the terminal device determines the length of the sequence or the length of the slot or the length of the mini-slot corresponding to each of the N PRACHs, the terminal device can determine the priorities of the N PRACHs based on the length of the sequence or the length of the slot or the length of the mini-slot corresponding to each of the N PRACHs in the first time period.

In a possible implementation, the priorities of the N PRACHs include: a shorter length of a sequence corresponding to a PRACH indicates a higher priority of the PRACH; a shorter length of a slot corresponding to a PRACH indicates a higher priority of the PRACH; or a shorter length of a mini-slot corresponding to a PRACH indicates a higher priority of the PRACH.

If a length of a sequence corresponding to a PRACH is shorter, or a length of a slot corresponding to a PRACH is shorter, or a length of a mini-slot corresponding to a PRACH is shorter, it indicates that a chance of successfully sending the PRACH is slighter and a requirement for sending the PRACH is more critical. Therefore, a priority of the PRACH is higher.

According to a fourth aspect, an embodiment of this application provides an information sending method.

N uplink channels of a terminal device in a first time period are corresponding to at least two network devices or at least two cell groups, the at least two network devices include at least a first network device and a second network device, and the at least two cell groups include at least a first cell group and a second cell group. The method includes: allocating, by the terminal device, transmit power to at least one of the N uplink channels in the first time period; and sending, by the terminal device, indication information to the second network device, where each of the at least one uplink channel is an uplink channel sent to the first network device; or sending, by the terminal device, indication information on the second cell group, where each of the at least one uplink channel is an uplink channel sent on the first cell group. N is greater than or equal to 2. The indication information is information indicating a second time period. The second time period is a sending gap in which the terminal device sends no uplink channel to the second network device, or the second time period is a gap in which the terminal device sends no uplink channel on the second cell group, and the second time period includes the first time period.

The uplink channel power allocation method in the first aspect is used to describe how the terminal device allocates the transmit power to the at least one of the N uplink channels in the first time period. The information sending method in the fourth aspect is used to describe how the terminal device sends the indication information to the second network device or how the terminal device sends the indication information on the second cell group after the terminal device allocates the transmit power to the at least one of the N uplink channels in the first time period in a scenario in which the N uplink channels of the terminal device in the first time period are corresponding to the at least two network devices or the at least two cell groups. After the terminal device performs the uplink channel power allocation method in the first aspect, if the N uplink channels of the terminal device in the first time period are corresponding to the at least two network devices or the at least two cell groups, the terminal device may further perform the information sending method in the fourth aspect. Therefore, there is a time sequence relationship between the uplink channel power allocation method in the first aspect and the information sending method in the fourth aspect.

In addition, the method in the fourth aspect not only may be combined with the method in the first aspect to obtain a new solution, but also may be combined with the possible implementations of the first aspect to obtain a new solution. Further, the method in the fourth aspect may be combined with the second aspect and the possible implementations of the second aspect to obtain a new solution, and the method in the fourth aspect may be combined with the third aspect and the possible implementations of the third aspect to obtain a new solution.

In the scenario in which the N uplink channels of the terminal device in the first time period are corresponding to the at least two network devices, according to the foregoing uplink channel power allocation method, the terminal device may preferably allocate, based on an order of priorities of the N uplink channels, transmit power to at least one uplink channel corresponding to an important service set, to ensure that transmit power is preferably allocated to an uplink channel corresponding to the important service set, thereby meeting a service requirement of a service set. Because each of the at least one uplink channel is an uplink channel sent to the first network device, the terminal device has no remaining transmit power to be allocated to an uplink channel corresponding to the second network device in the first time period. Therefore, the terminal device needs to send the indication information to the second network device, so that the second network device can learn, based on the indication information, that the terminal device sends no uplink channel to the second network device in the first time period, and the second network device can properly resolve a case in which no uplink channel is received in the first time period after receiving the indication information. In this way, the second network device does not consider noise in the first time period as an uplink channel sent by the terminal device to the second network device, and a buffer of the second network device avoids being contaminated, and therefore a case in which an uplink channel cannot be successfully received by the second network device after being retransmitted by the terminal device is avoided, thereby improving system resource efficiency.

In the scenario in which the N uplink channels of the terminal device in the first time period are corresponding to the at least two cell groups, according to the foregoing uplink channel power allocation method, the terminal device may preferably allocate, based on an order of priorities of the N uplink channels, transmit power to at least one uplink channel corresponding to an important service set, to ensure that transmit power is preferably allocated to an uplink channel corresponding to the important service set, thereby meeting a service requirement of a service set. Because the terminal device determines that each of the at least one uplink channel is an uplink channel sent on the first cell group, the terminal device has no remaining transmit power to be allocated to an uplink channel corresponding to the second cell group in the first time period. Therefore, the terminal device needs to send the indication information on the second cell group, so that the second cell group or a network device corresponding to the second cell group can learn, based on the indication information, that the terminal device sends no uplink channel on the second cell group in the first time period, and the second cell group or the network device corresponding to the second cell group can properly resolve a case in which no uplink channel is received in the first time period after receiving the indication information. In this way, the second cell group or the network device corresponding to the second cell group does not consider noise in the first time period as an uplink channel sent by the terminal device to the second cell group or the network device corresponding to the second cell group, and a case in which a buffer of the second cell group or a buffer of the network device corresponding to the second cell group is contaminated, and consequently an uplink channel cannot be successfully received by the second cell group or the network device corresponding to the second cell group after being retransmitted by the terminal device is avoided, thereby improving system resource efficiency.

In a possible implementation, the at least one uplink channel is all uplink channels sent by the terminal device in the first time period.

When the at least one uplink channel is all the uplink channels sent by the terminal device in the first time period, it indicates that the terminal device has no remaining transmit power to be allocated to an uplink channel sent to the second network device in the first time period. Therefore, the terminal device needs to send the indication information to the second network device, so that the second network device can learn, based on the indication information, that no uplink channel is received in the first time period. Alternatively, when the at least one uplink channel is all the uplink channels sent by the terminal device in the first time period, it indicates that the terminal device has no remaining transmit power to be allocated to an uplink channel on the second cell group in the first time period. Therefore, the terminal device needs to send the indication information to the second cell group, so that the second cell group or the network device corresponding to the second cell group can learn, based on the indication information, that no uplink channel is received in the first time period.

In a possible implementation, the allocating, by the terminal device, transmit power to at least one of the N uplink channels in the first time period includes: determining, by the terminal device, priorities of the N uplink channels based on a service set corresponding to each of the N uplink channels in the first time period, where each service set is corresponding to one priority, and at least one of service sets corresponding to the N uplink channels includes at least one service; and allocating, by the terminal device, the transmit power to the at least one of the N uplink channels based on the priorities of the N uplink channels.

In a possible implementation, before the sending, by the terminal device, indication information to the second network device, the method further includes: receiving, by the terminal device, first scheduling information sent by the second network device, where the first scheduling information is used to trigger the terminal device to send the at least one of the N uplink channels to the second network device in the first time period; or before the sending, by the terminal device, indication information on the second cell group, the method further includes: receiving, by the terminal device, second scheduling information on the second cell group, where the second scheduling information is used to trigger the terminal device to send the at least one of the N uplink channels on the second cell group in the first time period.

The second network device sends the first scheduling information to the terminal device in advance, so that the terminal device can send the at least one of the N uplink channels to the second network device in the first time period based on the first scheduling information. After the terminal device receives the first scheduling information sent by the second network device, the terminal device allocates transmit power to at least one uplink channel corresponding to the second network device before the first time period. If a priority of the at least one uplink channel corresponding to the second network device is lower than that of at least one uplink channel corresponding to the first network device, and the terminal device allocates all transmit power to the at least one uplink channel corresponding to the first network device in the first time period, the terminal device has no remaining transmit power to be allocated to an uplink channel corresponding to the second network device in the first time period.

The second cell group sends the second scheduling information to the terminal device in advance, so that the terminal device can send the at least one of the N uplink channels on the second cell group in the first time period based on the second scheduling information. After the terminal device receives the second scheduling information sent by the second cell group, the terminal device allocates transmit power to at least one uplink channel corresponding to the second cell group before the first time period. If a priority of the at least one uplink channel corresponding to the second cell group is lower than that of at least one uplink channel corresponding to the first cell group, and the terminal device allocates all transmit power to the at least one uplink channel corresponding to the first cell group in the first time period, the terminal device has no remaining transmit power to be allocated to an uplink channel corresponding to the second cell group in the first time period.

According to a fifth aspect, an embodiment of this application provides still another information sending method, to ensure that a network device or a cell group can properly resolve, based on indication information, a case in which no uplink channel is received in a first time period. The method includes: receiving, by a network device, indication information sent by a terminal device, where the indication information is information indicating a first time period, and the first time period is a sending gap in which the terminal device sends no uplink channel to the network device, or the first time period is a gap in which the terminal device sends no uplink channel on a second cell group; and determining, by the network device, the first time period based on the indication information.

After the network device receives the indication information sent by the terminal device, the network device determines the first time period based on the indication information, so that the network device learns, based on the indication information, that the terminal device sends no uplink channel to the network device in the first time period, or the cell group learns, based on the indication information, that the terminal device sends no uplink channel on the cell group in the first time period, so that the network device or the cell group can properly resolve, based on the indication information, a case in which no uplink channel is received in the first time period.

In a possible implementation, the determining, by the network device, the first time period based on the indication information includes: determining, by the network device, the first time period based on the indication information received by the network device and a second time period, where the second time period is a time period in which the network device receives the indication information.

In a possible implementation, the determining, by the network device, the first time period based on the indication information includes: determining, by the network device, the first time period based on the received indication information, a first rule, and a second time period, where the second time period is a time period in which the network device receives the indication information, and the first rule is used to indicate a preset offset between the first time period and the second time period, or the first rule is used to indicate information indicating that the first time period precedes the second time period or information indicating that the first time period follows the second time period.

The indication information may include a relative time period, the network device may store the first rule, and the network device may determine the first time period based on the second time period, the relative time period in the indication information, and the first rule in the network device. Certainly, the indication information may include the first rule, the network device may store a relative time period, and the network device may determine the first time period based on the second time period, the first rule in the indication information, and the relative time period in the network device.

In a possible implementation, the method further includes: when the first time period precedes the second time period, clearing, by the network device, uplink information of the terminal device received in the first time period; or when the first time period follows the second time period, skipping receiving, by the network device, uplink information of the terminal device in the first time period, where the second time period is the time period in which the network device receives the indication information.

The first time period is a gap in which the terminal device sends no uplink channel on the second cell group or a gap in which the terminal device sends no uplink channel to the network device, and the second time period is the time period in which the network device receives the indication information or a time period in which the network device receives the indication information on the second cell group. If the first time period precedes the second time period, it indicates that the network device incorrectly considers useless information such as noise, received in the first time period as useful information in an uplink channel sent by the terminal device. Therefore, the network device needs to clear the uplink information of the terminal device received in the first time period, that is, the network device clears the useless information such as noise, received in the first time period. In this way, a case in which a buffer of the second cell group or a buffer of the network device corresponding to the second cell group is contaminated, and consequently an uplink channel cannot be successfully received by the second cell group or the network device corresponding to the second cell group after being retransmitted by the terminal device is avoided, thereby improving system resource efficiency.

The first time period is a gap in which the terminal device sends no uplink channel on the second cell group or a gap in which the terminal device sends no uplink channel to the network device, and the second time period is the time period in which the network device receives the indication information or a time period in which the network device receives the indication information on the second cell group. If the first time period follows the second time period, it indicates that the network device has not received useless information such as noise in the first time period, and the network device does not incorrectly consider the useless information such as noise, received in the first time period as useful information in an uplink channel sent by the terminal device. Therefore, to prevent the network device from receiving the useless information such as noise in the first time period, the network device may skip receiving the uplink information of the terminal device in the first time period. In this way, a case in which a buffer of the second cell group or a buffer of the network device corresponding to the second cell group is contaminated, and consequently an uplink channel cannot be successfully received by the second cell group or the network device corresponding to the second cell group after being retransmitted by the terminal device is avoided, thereby improving system resource efficiency.

According to a sixth aspect, an embodiment of this application provides a terminal device. The terminal device includes: a processing module, configured to: determine priorities of N uplink channels based on a service set corresponding to each of the N uplink channels in a first time period, where each service set is corresponding to one priority, and at least one of service sets corresponding to the N uplink channels includes at least one service; and allocate transmit power to at least one of the N uplink channels based on the priorities of the N uplink channels, where N is greater than or equal to 2; and a sending module, configured to send the at least one uplink channel in the first time period based on the transmit power allocated to the at least one uplink channel.

The processing module of the terminal device in the sixth aspect is further configured to perform steps of the method in the possible implementations of the first aspect.

In a possible implementation, the processing module is specifically configured to: after determining that a sum of transmit power of the N uplink channels in the first time period is greater than a specified power threshold, determine the priorities of the N uplink channels based on the service set corresponding to each of the N uplink channels in the first time period.

In a possible implementation, the processing module is further configured to determine the service set corresponding to each of the N uplink channels.

In a possible implementation, the processing module is specifically configured to: determine the priority of each service set, and determine the priorities of the N uplink channels based on a priority of the service set corresponding to each of the N uplink channels in the first time period.

In a possible implementation, the processing module is specifically configured to: when L uplink channels in the N uplink channels are corresponding to a same service set, determine priorities of the L uplink channels according to a principle specified for the same service set, where N is greater than or equal to L, and L is greater than or equal to 2.

In a possible implementation, the processing module is further configured to determine the principle specified for the same service set.

The principle may be the principle described in the first aspect. For a type of the service set and the corresponding principle, refer to the foregoing descriptions in the first aspect.

In a possible implementation, one or more physical random access channels PRACHs are further included in the first time period. The processing module is further configured to allocate transmit power to at least one of the PRACHs. The processing module is specifically configured to allocate the transmit power to the at least one of the N uplink channels by using transmit power remaining after the allocation to the at least one PRACH.

In a possible implementation, the processing module is specifically configured to: determine a priority of a PRACH based on a service set corresponding to each PRACH, and allocate the transmit power to the at least one of the PRACHs based on the priority of the PRACH.

In a possible implementation, the processing module is specifically configured to: determine a priority of a PRACH based on a length of a sequence or a length of a slot corresponding to each PRACH, where a length of each sequence or a length of each slot is corresponding to one priority; and allocate the transmit power to the at least one of the PRACHs based on the priority of the PRACH.

In a possible implementation, the service set includes at least one of a first service set, a second service set, a third service set, or a fourth service set. The first service set includes an ultra-reliable and low latency communications URLLC service, the second service set includes an enhanced mobile broadband eMBB service, the third service set includes a massive machine-type communications mMTC service, and the fourth service set includes at least one of CSI, a HARQ, and an SR.

In a possible implementation, a priority corresponding to the first service set is higher than a priority corresponding to the second service set, and the priority corresponding to the first service set is higher than a priority corresponding to the third service set.

In a possible implementation, the priority corresponding to the second service set is higher than the priority corresponding to the third service set.

According to a seventh aspect, an embodiment of this application provides another terminal device. The terminal device includes: a processing module, configured to: determine priorities of N PRACHs based on a service set corresponding to each of the N PRACHs in a first time period, where each service set is corresponding to one priority, and at least one of service sets corresponding to N PRACHs includes at least one service; and allocate transmit power to at least one of the N PRACHs based on the priorities of the N PRACHs, where N is greater than or equal to 2; and a sending module, configured to send the at least one PRACH in the first time period based on the transmit power allocated to the at least one PRACH.

The processing module of the terminal device in the seventh aspect is further configured to perform steps of the method in the possible implementations of the second aspect.

According to an eighth aspect, an embodiment of this application provides still another terminal device. The terminal device includes: a processing module, configured to: determine priorities of N PRACHs based on a length of a sequence or a length of a slot or a length of a mini-slot corresponding to each of the N PRACHs in a first time period, where a length of each sequence or a length of each slot is corresponding to one priority; and allocate transmit power to at least one of the N PRACHs based on the priorities of the N PRACHs, where N is greater than or equal to 2; and a sending module, configured to send the at least one PRACH in the first time period based on the transmit power allocated to the at least one PRACH.

The processing module of the terminal device in the eighth aspect is further configured to perform steps of the method in the possible implementations of the third aspect.

According to a ninth aspect, an embodiment of this application provides still another terminal device. N uplink channels of the terminal device in a first time period are corresponding to at least two network devices or at least two cell groups, the at least two network devices include at least a first network device and a second network device, and the at least two cell groups include at least a first cell group and a second cell group. The terminal device includes: a processing module, configured to allocate transmit power to at least one of the N uplink channels in the first time period; and a sending module, configured to: send indication information to the second network device, where each of the at least one uplink channel is an uplink channel sent to the first network device; or send indication information on the second cell group, where each of the at least one uplink channel is an uplink channel sent on the first cell group. N is greater than or equal to 2. The indication information is information indicating a second time period. The second time period is a sending gap in which the terminal device sends no uplink channel to the second network device, or the second time period is a gap in which the terminal device sends no uplink channel on the second cell group, and the second time period includes the first time period.

The processing module of the terminal device in the ninth aspect is further configured to perform steps of the method in the possible implementations of the fourth aspect.

The processing module of the terminal device in the sixth aspect to the ninth aspect may be a component such as a processor or a controller, and the sending module of the terminal device in the sixth aspect to the ninth aspect may be a component such as a sender or a transmitter.

According to a tenth aspect, an embodiment of this application provides a network device. The network device includes: a receiving module, configured to receive indication information sent by a terminal device, where the indication information is information indicating a first time period, and the first time period is a sending gap in which the terminal device sends no uplink channel to the network device, or the first time period is a gap in which the terminal device sends no uplink channel on a second cell group; and a processing module, configured to determine the first time period based on the indication information. The processing module of the network device in the tenth aspect is further configured to perform steps of the method in the possible implementations of the fifth aspect.

The processing module of the network device in the tenth aspect may be a component such as a processor or a controller, and the receiving module of the network device in the tenth aspect may be a component such as a receiver or a transmitter.

An embodiment of this application further provides a computer readable storage medium, and the computer readable storage medium stores an instruction. When the instruction runs on a computer, the computer performs the method in any one of the first aspect to the fourth aspect.

An embodiment of this application provides a computer readable storage medium, and the computer readable storage medium stores an instruction. When the instruction runs on a computer, the computer performs any method in the fifth aspect.

An embodiment of this application further provides a computer program product, and the computer product includes an instruction. When the instruction runs on a computer, the computer performs the method in any one of the first aspect to the fourth aspect.

An embodiment of this application further provides a computer program product, and the computer product includes an instruction. When the instruction runs on a computer, the computer performs any method in the fifth aspect.

For effects of the foregoing apparatus embodiments, refer to the foregoing descriptions of the effects of the corresponding method embodiments. Details are not described again.

BRIEF DESCRIPTION OF THE DRAWINGS

To describe the technical solutions in the embodiments of this application more clearly, the following briefly describes the accompanying drawings required for the embodiments. Apparently, the accompanying drawings in the following description show merely some embodiments of this application, and a person of ordinary skill in the art may derive other drawings from these accompanying drawings without creative efforts.

DETAILED DESCRIPTION OF ILLUSTRATIVE EMBODIMENTS

Figure 1:
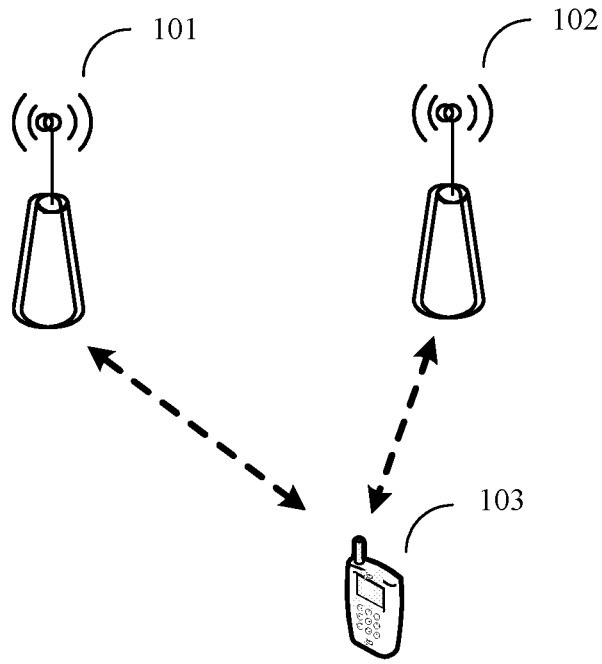
FIG. 1 shows an application scenario according to an embodiment of this application.

In a long term evolution-advanced (LTE-A) system, a process in which a terminal device allocates transmit power to a to-be-sent uplink channel usually includes the following steps: First, the terminal device prepares data or uplink control information that needs to be carried on an uplink channel in a target time period; then, the terminal device calculates a sum of transmit power required by all or some of uplink channels in the target time period; and finally, if the sum of the transmit power required by all the uplink channels in the target time period is greater than maximum allowable transmit power of the terminal device, the terminal device determines a descending order of priorities of the uplink channels based on a type of an uplink channel or information carried on an uplink channel, and allocates transmit power to an uplink channel in the target time period.

In a process of allocating transmit power to an uplink channel in the target time period, if transmit power of the terminal device is allocated to an uplink channel with a high priority in the target time period, remaining transmit power of the terminal device is allocated to an uplink channel with a low priority in the target time period. If there is no remaining transmit power, the terminal device does not allocate transmit power to the uplink channel with a low priority, and therefore the uplink channel with a low priority cannot be sent in the target time period.

It can be learned from a service requirement of a fifth-generation mobile radio technology system that a method for allocating transmit power to a to-be-sent uplink channel in the conventional LTE-A system cannot be applied to the fifth-generation mobile radio technology system. In the method for allocating transmit power to a to-be-sent uplink channel in the conventional LTE-A system, only a type of an uplink channel or information carried on an uplink channel is considered, but the service requirement of the fifth-generation mobile radio technology system is not considered. Therefore, in the method for allocating transmit power to a to-be-sent uplink channel in the LTE-A system, priorities cannot be classified based on service requirements corresponding to all service types, and therefore it cannot be ensured that transmit power is preferably allocated to an uplink channel corresponding to an important service type.

In view of the above, to resolve the problem that the method for allocating transmit power to an uplink channel in the LTE-A system is not applicable to the fifth-generation mobile radio technology system, embodiments of this application provide an uplink channel power allocation method and an apparatus, to effectively allocate transmit power to an uplink channel. With reference to the accompanying drawings in the embodiments of this application, the following describes the uplink channel power allocation method and the apparatus provided in the embodiments of this application.

The uplink channel power allocation method and the apparatus provided in the embodiments of this application may be applied to wireless communications systems such as a global system for mobile communications (GSM) system, a code division multiple access (CDMA) system, a wideband code division multiple access (WCDMA) system, a general packet radio service (GPRS) system, and a universal mobile telecommunications system (UMTS), and are particularly applied to a long term evolution (LTE) system and an evolved system thereof, and a new generation (NR) wireless communications system.

FIG. 1 shows an application scenario according to an embodiment of this application. The scenario includes a cell base station 101, a cell base station 102, and a terminal device 103 that is located within coverage of the cell base station 101 and the cell base station 102 and that communicates with the cell base station 101 and the cell base station 102. The cell base station 101 and the cell base station 102 are base stations of a wireless communications system, and the terminal device 103 is a terminal device of the corresponding wireless communications system.

Network elements in the embodiments of this application are mainly a base station and a terminal device that may work on a licensed frequency band or a unlicensed frequency band.

Before specific embodiments are described, concepts such as a base station, a cell, a carrier, and a terminal device in this application are first briefly described.

In this application, both the licensed frequency band and the unlicensed frequency band may include one or more carriers. Carrier aggregation is performed on the licensed frequency band and the unlicensed frequency band, including performing carrier aggregation on one or more carriers included in the licensed frequency band and one or more carriers included in the unlicensed frequency band.

The cell mentioned in this application may be a cell corresponding to a base station. The cell may belong to a macro base station, or may belong to a base station corresponding to a small cell. Small cells herein may include a metro cell, a micro cell, a pico cell, a femto cell, and the like. The small cells have features of small coverage and low transmit power, and are used to provide high-speed data transmission services.

A plurality of intra-frequency cells may work on a carrier in a wireless communications system. In some special scenarios, it may be considered that a concept of the carrier is equivalent to a concept of the cell in the wireless communications system. For example, in a carrier aggregation scenario, when a secondary component carrier is configured for a terminal device, both a carrier index of the secondary component carrier and a cell identifier (Cell ID) of a secondary serving cell that works on the secondary component carrier are carried. In this case, it may be considered that the concept of the carrier is equivalent to the concept of the cell. For example, access to a carrier by the terminal device is equivalent to access to a cell by the terminal device.

The embodiments are described with reference to a terminal device in this application. The terminal device may be referred to as user equipment (UE), a mobile station (MS), a mobile terminal, an intelligent terminal, or the like. The terminal device may communicate with one or more core networks by using a radio access network (RAN). For example, the terminal device may be a mobile phone (or referred to as a "cellular" phone), or a computer with a mobile terminal. The terminal device may be alternatively a portable, pocket-size, handheld, computer built-in, or in-vehicle mobile apparatus, and a terminal device in a future NR network, which exchanges voice or data with the radio access network. In this application, the terminal device may further include a relay. Any device that can perform data communication with a base station may be considered as the terminal device. In this application, the terminal device is described in a general sense.

In addition, the embodiments are described with reference to a network device in this application. The network device may be an evolved NodeB (eNB), a macro base station, a micro base station (also referred to as a "small cell"), a pico base station, an access station (AP), a transmission station (TP), a new generation NodeB (gNode), or the like in an LTE system, an NR system, or a licensed-assisted access using long term evolution (LAA-LTE) system.

Optionally, a time period is one or more symbols, one or more symbol groups, one or more mini-slots, one or more slots, or one or more subframes. The symbol may be a symbol whose subcarrier spacing is 15 kHz, or may be a symbol whose subcarrier spacing is greater than 15 kHz in a communications system. The slot is a slot whose subcarrier spacing is 15 kHz, or is a slot whose subcarrier spacing is greater than 15 kHz in a communications system, and a length of the slot may be less than 0.5 ms. The mini-slot is a mini-slot whose subcarrier spacing is 60 kHz, or is a slot whose subcarrier spacing is another value in a communications system, and a length of the mini-slot may be less than that of the slot. The subframe is a subframe whose subcarrier spacing is 15 kHz, or a subframe whose subcarrier spacing is greater than 15 kHz in a communications system, and a length of the subframe may be less than 1 ms. This is not limited in the embodiments. For example, subcarrier spacing greater than 15 kHz may be 30 kHz, 60 kHz, or 120 kHz. This is not limited in the embodiments.

Optionally, a mini-slot is a time interval including two symbols in time domain whose subcarrier spacing is 60 kHz.

Optionally, a meaning of the symbol is equivalent to an OFDM symbol or an SC-FDMA symbol. The symbol is an orthogonal frequency division multiple access OFDMA symbol or a single carrier frequency division multiple access SC-FDMA symbol with a 15 kHz subcarrier spacing in the LTE system, or a symbol with a larger subcarrier spacing in a communications system. This is not limited in the embodiments.

Figure 2:
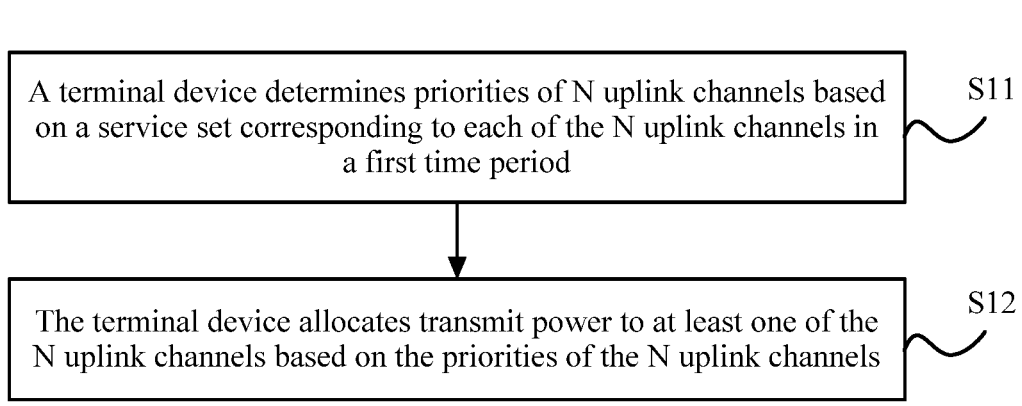
FIG. 2 is a flowchart of an uplink channel power allocation method according to an embodiment of this application.

FIG. 2 is a flowchart of an uplink channel power allocation method according to an embodiment of this application.

In the uplink channel power allocation method shown in FIG. 2, transmit power can be preferably allocated to an uplink channel corresponding to an important service type. The method includes the following steps.

Step S11: A terminal device determines priorities of N uplink channels based on a service set corresponding to each of the N uplink channels in a first time period, where each service set is corresponding to one priority, and at least one of service sets corresponding to the N uplink channels includes at least one service.

N is a positive integer greater than or equal to 2. The uplink channel may be an uplink channel except a physical random access channel (PRACH). Certainly, the uplink channel may be alternatively a channel that carries uplink data.

The terminal device mentioned in this embodiment of this application may be a device such as a smartphone, a tablet computer, or a smart TV, and a network device may include a device such as an eNB or a gNodeB.

For the service mentioned in this embodiment of this application, each service may have a plurality of requirements. For example, a latency requirement of a URLLC service may be 1 ms or 2 ms, or there may be another latency requirement. This is not limited in this application. Reliability of the URLLC service may be 10e−5 or 10e−3, or there may be another reliability value. This is not limited in this application.

Optionally, the terminal device determines the priorities of the N uplink channels based on the service set corresponding to each of the N uplink channels in the first time period only when the uplink channel may be an uplink channel except a PRACH. Further, when the N uplink channels include A PRACHs, the terminal device may first determine priorities of the A PRACHs based on a service set corresponding to a PRACH, or may determine priorities of the A PRACHs based on a length of a sequence corresponding to a PRACH or a length of a slot corresponding to a PRACH or a length of a mini-slot corresponding to a PRACH, that is, a priority of a PRACH is higher than that of an uplink channel except the PRACH, and then determine priorities of N-A uplink channels based on a service set corresponding to each of the N-A uplink channels in the first time period. A is a positive integer greater than or equal to 0.

For example, it is assumed that N is 10, and A is 2. In other words, 10 uplink channels of the terminal device in the first time period include two PRACHs. Because a priority of a PRACH is higher than that of an uplink channel except the PRACH, the terminal device may first determine priorities of the two PRACHs based on service sets corresponding to the two PRACHs, or the terminal device may determine priorities of the two PRACHs based on lengths of sequences corresponding to the two PRACHs, lengths of slots corresponding to the PRACHs, or lengths of mini-slots corresponding to the PRACHs. Then the terminal device determines priorities of eight uplink channels in the 10 uplink channels except the two PRACHs in the first time period based on service sets corresponding to the eight uplink channels.

Optionally, the terminal device determines the priorities of the N uplink channels based on the service set corresponding to each of the N uplink channels in the first time period only when all uplink channels are uplink data channels. Otherwise, when the uplink channel is a channel other than an uplink data channel, the terminal device determines the priorities of the N uplink channels according to another criterion. It may be understood that the uplink data channel herein not only may carry uplink data, but also may carry uplink control information, and the uplink control information includes a hybrid automatic repeat request (HARQ), channel state information (CSI), and the like. The CSI may include one or more of a channel quality indicator (CQI), a rank indicator (RI), or a precoding matrix indicator (PMI).

The N uplink channels may be corresponding to a plurality of service sets. In the plurality of service sets, some service sets include at least one service, but some service sets do not include a service. Each service set is corresponding to one priority. In other words, when one service set includes two services, the two services are corresponding to a same priority.

For example, it is assumed that a first service set includes an ultra-reliable and low latency communications (URLLC) service, a second service set includes an enhanced mobile broadband (eMBB) service, a third service set includes a massive machine-type communications (mMTC) service, and a fourth service set includes CSI information. The URLLC service, the eMBB service, and the mMTC service all belong to services, but the CSI information does not belong to a service.

Optionally, a scheduling request (SR), a PRACH, and a HARQ may belong to services. For example, a resource applied for by using the SR may be implicitly corresponding to a service applied for, a carrier on which the PRACH is located may be corresponding to a service, and an positive acknowledgement (ACK)/a negative acknowledgement (NACK) fed back by the HARQ is corresponding to feedback information of a service.

Optionally, the service set includes at least one of the first service set, the second service set, the third service set, and the fourth service set. The first service set includes the URLLC service, the second service set includes the eMBB service, or the eMBB service and a service other than the URLLC, the third service set includes the mMTC service, or the mMTC service and a service other than the URLLC and the eMBB, and the fourth service set includes information that is not corresponding to a service or does not belong to a service, or information that is not corresponding to a service or does not belong to a service and a service other than the URLLC, the eMBB, and the mMTC.

Optionally, a priority corresponding to the first service set is higher than a priority corresponding to the second service set, the priority corresponding to the first service set is higher than a priority corresponding to the third service set, the priority corresponding to the second service set is higher than or equal to the priority corresponding to the third service set, and the priority corresponding to the third service set is higher than a priority corresponding to the fourth service set. For example, the first service set includes only the URLLC service, the second service set includes only the eMBB service, the third service set includes only the mMTC service, and the fourth service set includes only information such as CSI that is not corresponding to a service or does not belong to a service. For another example, the first service set includes the URLLC service, the second service set includes the eMBB service, or the eMBB service and a service other than the URLLC, the third service set includes the mMTC service, or the mMTC service and a service other than the URLLC and the eMBB, and the fourth service set includes information that is not corresponding to a service or does not belong to a service, or information that is not corresponding to a service or does not belong to a service and a service other than the URLLC, the eMBB, and the mMTC.

Optionally, a priority corresponding to the first service set is higher than a priority corresponding to the second service set, the priority corresponding to the second service set is higher than or equal to a priority corresponding to the third service set, and the priority corresponding to the third service set is higher than a priority corresponding to the fourth service set. For example, the first service set includes only the URLLC service, the second service set includes only the eMBB service, the third service set includes only the mMTC service, and the fourth service set includes only information such as CSI that is not corresponding to a service or does not belong to a service. For another example, the first service set includes the URLLC service, the second service set includes the eMBB service, or the eMBB service and a service other than the URLLC, the third service set includes the mMTC service, or the mMTC service and a service other than the URLLC and the eMBB, and the fourth service set includes information that is not corresponding to a service or does not belong to a service, or information that is not corresponding to a service or does not belong to a service and a service other than the URLLC, the eMBB, and the mMTC.

Optionally, a priority corresponding to the first service set is higher than a priority corresponding to the second service set, a priority corresponding to the fourth service set is higher than the priority corresponding to the second service set, and the priority corresponding to the second service set is higher than or equal to a priority corresponding to the third service set. For example, the first service set includes only the URLLC service, the second service set includes only the eMBB service, the third service set includes only the mMTC service, and the fourth service set includes at least one of the CSI, the HARQ, and the SR. For another example, the first service set includes the URLLC service, the second service set includes the eMBB service, or the eMBB service and a service other than the URLLC, the third service set includes the mMTC service, or the mMTC service and a service other than the URLLC and the eMBB, and the fourth service set includes at least one of the CSI, the HARQ, and the SR.

Each of the N uplink channels in the first time period is corresponding to one service set, and each service set is corresponding to one priority. Therefore, the terminal device may determine the priorities of the N uplink channels based on the service sets corresponding to the N uplink channels and the priority corresponding to each service set.

The following describes an execution process of step S11 by using an application example.

Referring to Table 1 to Table 3, Table 1 shows a correspondence between N uplink channels and a plurality of service sets, Table 2 shows a correspondence between a plurality of service sets and priorities, and Table 3 shows a correspondence between N uplink channels and priorities.

TABLE 1

| Uplink channel | Service set |
| --- | --- |
| Uplink channel A | First service set |
| Uplink channel B | Second service set |
| Uplink channel C | Third service set |
| Uplink channel D | Fourth service set |

TABLE 2

| Service set | Priority |
| --- | --- |
| First service set | First priority |
| Second service set | Second priority |

TABLE 2-continued

| Service set | Priority |
| --- | --- |
| Third service set | Third priority |
| Fourth service set | Fourth priority |

TABLE 3

| Uplink channel | Priority |
| --- | --- |
| Uplink channel A | First priority |
| Uplink channel B | Second priority |
| Uplink channel C | Third priority |
| Uplink channel D | Fourth priority |

Refer to the content shown in Table 1 to Table 3. For example, it is assumed that the terminal device has four uplink channels in the first time period: the uplink channel A, the uplink channel B, the uplink channel C, and the uplink channel D. The terminal device may determine a correspondence between an uplink channel and a service set, namely, the content in Table 1. The terminal device may determine that the uplink channel A is corresponding to the first service set, the uplink channel B is corresponding to the second service set, the uplink channel C is corresponding to the third service set, and the uplink channel D is corresponding to the fourth service set. The terminal device may further determine a priority corresponding to each service set, namely, the content in Table 2. The terminal device may determine that the first service set is corresponding to the first priority, the second service set is corresponding to the second priority, the third service set is corresponding to the third priority, and the fourth service set is corresponding to the fourth priority. In this case, the terminal device may determine a priority of an uplink channel based on a correspondence between an uplink channel and a service set and a correspondence between a service set and a priority, namely, the content in Table 3. The terminal device may determine that the uplink channel A is corresponding to the first priority, the uplink channel B is corresponding to the second priority, the uplink channel C is corresponding to the third priority, and the uplink channel D is corresponding to the fourth priority. It should be noted that if the correspondences in Table 1 and Table 2 are predefined, the terminal device may directly obtain content of the entire table without performing determining.

Step S12: The terminal device allocates transmit power to at least one of the N uplink channels based on the priorities of the N uplink channels, where N is greater than or equal to 2.

After the terminal device determines the priorities of the N uplink channels, because maximum allowable transmit power of the terminal device may not be enough to allocate transmit power to the N uplink channels in the first time period, the terminal device allocates the transmit power to the at least one of the N uplink channels based on an order of the priorities of the N uplink channels.

For example, it is assumed that the terminal device has four uplink channels in the first time period: the uplink channel A, the uplink channel B, the uplink channel C, and the uplink channel D. In addition, the terminal device has determined that the uplink channel A is corresponding to the first priority, the uplink channel B is corresponding to the second priority, the uplink channel C is corresponding to the third priority, and the uplink channel D is corresponding to the fourth priority. The terminal device allocates transmit power to four uplink channels in the first time period based on priorities of the four uplink channels. It is assumed that the first priority is higher than the second priority, the second priority is higher than the third priority, the fourth priority is higher than the second priority, and the first priority is higher than the fourth priority. After the terminal device allocates transmit power to the uplink channel A, if the terminal device has remaining transmit power in the first time period, the terminal device allocates transmit power to the uplink channel D. If the terminal device still has remaining transmit power in the first time period, the terminal device allocates transmit power to the uplink channel B. In this case, if the terminal device has no remaining transmit power in the first time period, the terminal device cannot allocate transmit power to the uplink channel C. In other words, the terminal device allocates transmit power to channels in descending order of priorities until there is no remaining transmit power.

For another example, the terminal device has determined that the uplink channel A is corresponding to the first priority, the uplink channel B and the uplink channel C are corresponding to the second priority, and the uplink channel D is corresponding to the third priority, and the terminal device allocates transmit power to the four uplink channels based on the priorities of the four uplink channels in the first time period. It is assumed that the first priority is higher than the second priority, and the third priority is higher than the second priority. After the terminal device allocates transmit power to the uplink channel A, if the terminal device has remaining transmit power in the first time period, the terminal device allocates transmit power to the uplink channel D. Then, if remaining transmit power cannot meet all requirements of the uplink channel B and the uplink channel C, the uplink channel B and the uplink channel C are simultaneously compressed, and therefore total transmit power does not exceed a power threshold. The power threshold is the maximum allowable transmit power of the terminal device in the first time period.

In addition, after the terminal device allocates the transmit power to the at least one of the N uplink channels based on the priorities of the N uplink channels, the terminal device sends the at least one uplink channel in the first time period based on the transmit power allocated to the at least one uplink channel.

In this embodiment of this application shown in FIG. 2, a priority of an uplink channel may be determined based on a priority of a service set corresponding to the uplink channel. Because a priority of an important service set is high, the terminal device may preferably allocate, based on an order of the priorities of the N uplink channels, transmit power to at least one uplink channel corresponding to the important service set, to ensure that transmit power is preferably allocated to an uplink channel corresponding to the important service set, thereby meeting a service requirement of a service set.

In a possible implementation of this embodiment of this application, the step in which a terminal device determines priorities of N uplink channels based on a service set corresponding to each of the N uplink channels in a first time period further includes: if a sum of transmit power of the N uplink channels in the first time period is greater than a specified power threshold, the terminal device determines the priorities of the N uplink channels based on the service set corresponding to each of the N uplink channels in the first time period.

In this embodiment of this application, when the sum of the transmit power of the N uplink channels in the first time period is greater than the specified power threshold, the terminal device considers preferably allocating transmit power to an uplink channel corresponding to an important service set, and determines the priorities of the N uplink channels based on the service set corresponding to each of the N uplink channels in the first time period. When the sum of the transmit power of the N uplink channels in the first time period is less than or equal to the specified power threshold, the terminal device may allocate transmit power to the N uplink channels. In this case, the terminal device does not need to consider an uplink channel corresponding to an important service set, that is, the terminal device may directly allocate transmit power to the N uplink channels without determining the priorities of the N uplink channels.

In a possible implementation of this embodiment of this application, before the priorities of the N uplink channels are determined, the method in this embodiment of this application may further include the following step: the terminal device determines the service set corresponding to each of the N uplink channels, or the terminal device determines a correspondence between the N uplink channels and service sets.

After the terminal device determines the service set corresponding to each of the N uplink channels, the terminal device can determine the priorities of the N uplink channels based on the service set corresponding to each of the N uplink channels in the first time period.

Optionally, that the terminal device determines the service set corresponding to each of the N uplink channels specifically includes: the terminal device determines, based on received higher layer signaling sent by the network device, the service set corresponding to each of the N uplink channels; or the terminal device determines, based on received physical layer signaling sent by the network device, the service set corresponding to each of the N uplink channels, where the physical layer signaling may be downlink control information, and a special information field in the downlink control information is used to indicate a priority.

Optionally, that the terminal device determines, based on received higher layer signaling, the service set corresponding to each of the N uplink channels specifically includes: the terminal device determines, based on first higher layer signaling sent by an upper-layer protocol layer of the terminal device to a physical layer of the terminal device, the service set corresponding to each of the N uplink channels, where the upper-layer protocol layer is at least one protocol layer of each protocol layer above the physical layer. The upper-layer protocol layer may be specifically at least one of the following protocol layers: a medium access control (MAC) layer, an radio link control (RLC) layer, a packet data convergence protocol (PDCP) layer, an radio resource control (RRC) layer, a non-access stratum (NAS) layer, and the like.

Optionally, that the terminal device determines the service set corresponding to each of the N uplink channels specifically includes: the terminal device determines, based on predefined information, the service set corresponding to each of the N uplink channels.

The predefined information may be a correspondence between a carrier and a service set. For example, a carrier 1 is corresponding to the first service set, and a carrier 2 is corresponding to the second service set. It may be understood that all uplink channels on the carrier 1 are corresponding to the first service set, and all uplink channels on the carrier 2 are corresponding to the second service set.

The predefined information may be alternatively a correspondence between a network device and a service set. For example, a first network device is corresponding to the first service set, a second network device is corresponding to the second service set, the first network device is a primary network device or a primary cell group, and the second network device is a secondary network device or a secondary cell group. It may be understood that all uplink channels sent to the first network device or all uplink channels on the primary cell group are corresponding to the first service set, and all uplink channels sent to the second network device or all uplink channels on the secondary cell group are corresponding to the second service set.

The predefined information may be alternatively a correspondence between an uplink channel and a service set. For example, a first uplink channel is corresponding to the first service set, and a second uplink channel is corresponding to the second service set.

In a possible implementation of this embodiment of this application, that a terminal device determines priorities of N uplink channels based on a service set corresponding to each of the N uplink channels in a first time period includes the following steps: the terminal device determines the priority of each service set; and the terminal device determines the priorities of the N uplink channels based on a priority of the service set corresponding to each of the N uplink channels in the first time period.

The terminal device may specifically determine the priority of each service set in the following manners.

In a first manner, the terminal device may determine the priority of each service set based on a prestored priority of each service set. In a second manner, the terminal device may determine the priority of each service set by using higher layer signaling sent by the upper-layer protocol layer of the terminal device. In a third manner, the terminal device may determine the priority of each service set by using higher layer signaling sent by the network device. In a fourth manner, the terminal device may determine the priority of each service set by using physical layer signaling sent by the network device.

Further, the terminal device may alternatively determine a priority of a service set based on content in the service set. For example, the first service set includes the URLLC service, the second service set includes only a service other than the URLLC, and the third service set includes only the CSI. In this case, the priority of the first service set is higher than that of the second service set, and the priority of the second service set is higher than that of the third service set. Therefore, after determining the priority of each service set, the terminal device determines the priorities of the N uplink channels based on the priority of the service set corresponding to each of the N uplink channels in the first time period.

Figure 3:
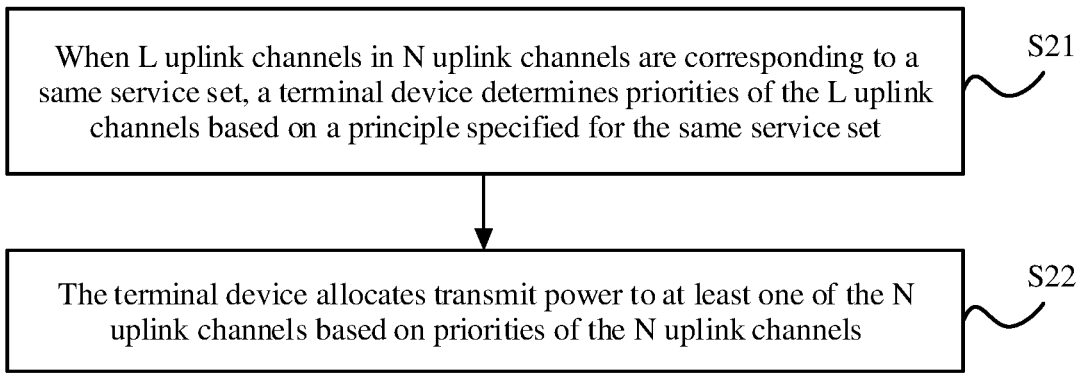
FIG. 3 is a flowchart of another uplink channel power allocation method according to an embodiment of this application.

FIG. 3 is a flowchart of another uplink channel power allocation method according to an embodiment of this application. The embodiment shown in FIG. 3 is an embodiment improved based on FIG. 2. For content that is the same as content in FIG. 2, refer to the embodiment shown in FIG. 2. The method shown in FIG. 3 includes the following steps.

Step S21: When L uplink channels in N uplink channels are corresponding to a same service set, a terminal device determines priorities of the L uplink channels according to a principle specified for the same service set, where N is greater than or equal to L, and L is greater than or equal to 2.

Optionally, that a terminal device determines priorities of the L uplink channels according to a principle specified for the same service set may further specifically include: a sum of transmit power of the L uplink channels is greater than a power threshold. It may be understood that if the sum of the transmit power of the L uplink channels is greater than the power threshold, the terminal device determines the priorities of the L uplink channels. Otherwise, the terminal device directly allocates transmit power to the L uplink channels without determining the priorities of the L uplink channels.

That the L uplink channels are corresponding to the same service set means that at least two of the N uplink channels are corresponding to a same service set.

Table 4 shows a correspondence between an uplink channel and a service set.

TABLE 4

| Uplink channel | Service set |
| --- | --- |
| Uplink channel J, uplink channel E | First service set |
| Uplink channel F, uplink channel G | Second service set |

Refer to Table 4. For example, it is assumed that the terminal device has four uplink channels in a first time period: the uplink channel J, the uplink channel E, the uplink channel F, and the uplink channel G. In the first time period, two uplink channels are corresponding to the first service set, and two uplink channels are corresponding to the second service set.

Because each service set is corresponding to one principle, the terminal device may determine the priorities of the L uplink channels according to the principle corresponding to the service set.

The principle mentioned in step S21 may be at least one of the following: an information transmission deadline corresponding to an uplink channel, an information transmission latency requirement corresponding to an uplink channel, a quantity of remaining HARQ transmission times of a HARQ process corresponding to an uplink channel, a spacing of a subcarrier on which an uplink channel is located, a length of a slot in which an uplink channel is located, an information sending period corresponding to an uplink channel, and a length of a mini-slot in which an uplink channel is located.

Further, the principle mentioned in step S21 may be at least one of the following.

For information transmission of the same service set, an earlier information transmission deadline corresponding to an uplink channel indicates a higher priority of the uplink channel. When information transmission for the same service set needs to be successfully completed in a fixed time, an uplink channel corresponding to the service set needs to be successfully transmitted in a fixed time. Therefore, if an information transmission deadline corresponding to an uplink channel is earlier, it indicates that a requirement for successfully transmitting the uplink channel is more critical. In this case, a priority of the uplink channel is higher, so that a critical uplink channel can be preferably transmitted, and a critical service can be preferably transmitted. The transmission deadline may be a time period in which an end point of the fixed time is located, or may be a predefined time period before a time period in which an end point of the fixed time is located. For example, both the uplink channel J and the uplink channel E need to be sent. An information transmission deadline of the uplink channel J is a slot 10, and an information transmission deadline of the uplink channel E is a slot 8. In this case, a priority of the uplink channel E is higher than that of the uplink channel J.

For information transmission of the same service set, a requirement of an uplink channel for a lower information transmission latency indicates a higher priority of the uplink channel. When information transmission for the same service set is corresponding to a same information transmission latency requirement, uplink channels corresponding to the service set are corresponding to a same information transmission latency requirement. Therefore, when an uplink channel requires a lower transmission latency, it indicates that a requirement for transmitting the uplink channel is more critical. In this case, a priority of the uplink channel is higher, so that a critical uplink channel can be preferably transmitted, and a critical service can be preferably transmitted. The latency requirement may be a predefined time length, or may be a time length configured by using higher layer signaling or notified by using physical layer signaling. For example, both the uplink channel J and the uplink channel E need to be sent. An information transmission latency requirement of the uplink channel J is 1 ms, and an information transmission latency requirement of the uplink channel E is 2 ms. In this case, a priority of the uplink channel J is higher than that of the uplink channel E.

For information transmission of the same service set, a smaller quantity of remaining HARQ transmission times of a HARQ process corresponding to an uplink channel indicates a higher priority of the uplink channel. It may be understood that if an uplink channel is an uplink data channel, data information in the uplink channel is corresponding to one uplink HARQ process. If an uplink channel is an uplink control channel that carries an ACK/NACK, ACK/NACK information in the uplink channel is corresponding to feedback information of one downlink HARQ process. A quantity of remaining HARQ transmission times of a HARQ process corresponding to an uplink channel is smaller. A network device sets a maximum quantity of HARQ transmission times for a HARQ process of the terminal device. Maximum quantities of times of all HARQ processes may be the same or may be different. Once a quantity of transmission times of a HARQ process reaches a maximum quantity of HARQ transmission times, but transmission has not succeeded, the network device considers that the HARQ process of the terminal device is not correctly transmitted at a MAC layer, and retransmission at an RLC layer is started, thereby bringing a higher latency. Herein, when a quantity of remaining HARQ transmission times of a HARQ process corresponding to an uplink channel is smaller, it indicates that a quantity of remaining times of transmitting the HARQ process corresponding to the uplink channel at the MAC layer is small. To avoid a transmission latency caused by introducing retransmission at the RLC layer or at a higher layer, a priority of the uplink channel is set to be higher, thereby avoiding more transmission latencies and improving system efficiency. For example, both the uplink channel J and the uplink channel E need to be sent. A quantity of remaining HARQ transmission times of a first HARQ process corresponding to the uplink channel J is 1, and a quantity of remaining HARQ transmission times of a second HARQ process of the uplink channel E is 2. In this case, a priority of the uplink channel J is higher than that of the uplink channel E. Both the first HARQ process and the second HARQ process herein may be uplink HARQ processes or downlink HARQ processes, or one of the first HARQ process and the second HARQ process may be an uplink HARQ process and the other is a downlink HARQ process.

For information transmission of the same service set, a larger spacing of a subcarrier on which an uplink channel is located indicates a higher priority of the uplink channel. In a fifth-generation communications system, a subcarrier spacing is configurable, and ranges from 15 kHz to 480 kHz. It may be understood that a larger subcarrier spacing indicates that a time domain resource on which the uplink channel is located is shorter, and a capability of the uplink channel to resist time domain extension is weaker. Therefore, a spacing of a subcarrier on which an uplink channel is located is set to be larger, and a priority of the uplink channel is higher, so that an uplink channel that is vulnerable to performance impact can be preferably sent, thereby improving system transmission efficiency. For example, both an uplink channel J and an uplink channel E need to be sent. A spacing of a subcarrier on which the uplink channel J is located is 15 kHz, and a spacing of a subcarrier on which the uplink channel E is located is 60 kHz. In this case, a priority of the uplink channel J is higher than that of the uplink channel E.

For information transmission of the same service set, a shorter length of a slot in which an uplink channel is located or a shorter length of a mini-slot in which an uplink channel is located indicates a higher priority of the uplink channel. In a fifth-generation communications system, a length of a slot or a length of a mini-slot is configurable. If a length of a slot or a length of a mini-slot in which an uplink channel is located is shorter, a transmission time granularity is finer, and the network device may transmit information that is more sensitive to a latency or more important information on the uplink channel. Therefore, a length of a slot or a length of a mini-slot in which an uplink channel is located is set to be shorter, and a priority of the uplink channel is higher, so that an uplink channel that can bring a latency benefit can be preferably sent, thereby improving system transmission efficiency. For example, both the uplink channel J and the uplink channel E need to be sent. A length of a slot or a length of a mini-slot in which the uplink channel J is located is 0.5 ms, and a length of a slot or a length of a mini-slot in which the uplink channel E is located is 0.125 ms. In this case, a priority of the uplink channel E is higher than that of the uplink channel J. A length of a slot herein is greater than a length of a mini-slot, and a length of a mini-slot may include one or more symbols.

For information transmission of the same service set, a shorter information sending period corresponding to an uplink channel indicates a higher priority of the uplink channel. It may be understood that information transmission for the service set is corresponding to a same transmission period, and information may be eMTC information or may be CSI information. When the information is CSI information, and an information sending period corresponding to an uplink channel shorter, it indicates that a requirement of the network device for the CSI is more critical. In this case, a priority of the uplink channel is higher, so that critical CSI can be preferably transmitted, and the network device can preferably learn of the CSI, thereby improving system transmission efficiency. When the information is eMTC service information, for information transmission of the same service set, if an information sending period corresponding to an uplink channel is longer, a priority of the uplink channel is higher. Because a sending period of an eMTC service is relatively long, a service with a short sending period can be transmitted more quickly next time, thereby preferably ensuring that a service that cannot be transmitted again for a long time is preferably transmitted. In this case, a priority of an uplink channel corresponding to a long sending period is higher, so that a relatively important uplink channel can be preferably transmitted, and an important service can be preferably transmitted. The sending period may be predefined, or may be configured by the network device by using physical layer signaling or higher layer signaling. For example, for the CSI, both the uplink channel J and the uplink channel E need to be sent. An information sending period corresponding to the uplink channel J is 5 ms, and an information sending period corresponding to the uplink channel E is 20 ms. In this case, a priority of the uplink channel J is higher than that of the uplink channel E. For example, for the eMTC, both the uplink channel J and the uplink channel E need to be sent. An information sending period corresponding to the uplink channel J is 1000 ms, and an information sending period corresponding to the uplink channel E is 40000 ms. In this case, a priority of the uplink channel E is higher than that of the uplink channel J.

For information transmission of the same service set, if an information transmission deadline corresponding to an uplink channel is earlier, or an uplink channel requires a lower information transmission latency, or a quantity of remaining HARQ transmission times of a HARQ process corresponding to an uplink channel is smaller, or a spacing of a subcarrier on which an uplink channel is located is larger, or a length of a slot in which an uplink channel is located is shorter, or an information sending period corresponding to an uplink channel is shorter, it indicates that a chance of successfully sending the uplink channel is slighter and a requirement for sending the uplink channel is more critical. Therefore, a priority of the uplink channel is higher.

In a possible implementation of this embodiment of this application, before the terminal device determines the priorities of the L uplink channels according to the principle specified for the same service set, the method further includes: the terminal device determines the principle specified for the same service set.

When the L uplink channels in the N uplink channels are corresponding to the same service set, the terminal device may first determine the principle specified for the same service set, and then determine the priorities of the L uplink channels according to the principle.

Optionally, that the terminal device determines the principle specified for the same service set specifically includes: terminal device determines, based on information included in the same service set, the principle designed for the same service set. The information may be a service such as a URLLC service, an eMBB service, or an mMTC service, or may be control information such as CSI, a HARQ, or an SR. For example, if information included in the first service set is URLLC service information, the terminal device determines a first principle designed for the first service set. If information included in the second service set is eMBB service information, the terminal device determines a second principle designed for the second service set. Herein, the first principle is different from the second principle. For example, the first principle is the information transmission deadline corresponding to the uplink channel or the information transmission latency requirement corresponding to the uplink channel, and the second principle is the quantity of remaining HARQ transmission times of the HARQ process corresponding to the uplink channel, the spacing of the subcarrier on which the uplink channel is located, or the length of the slot in which the uplink channel is located. Principles are specified for information included in different service sets, so that an attribute of information in a service set can be matched with a principle, and a relatively important uplink channel in the L uplink channels corresponding to the service set can be identified, to preferably allocate transmit power to an important uplink channel.

Optionally, the service set includes at least one of the first service set, the second service set, the third service set, and a fourth service set. The first service set includes the URLLC service, the second service set includes the eMBB service, or the eMBB service and a service other than the URLLC, the third service set includes the mMTC service, or the mMTC service and a service other than the URLLC and the eMBB, and the fourth service set includes at least one of the CSI, the HARQ, and the SR.

Optionally, that the terminal device determines the principle specified for the same service set specifically includes: the terminal device determines, based on received higher layer signaling sent by the network device, the principle specified for the same service set; or the terminal device determines, based on received physical layer signaling sent by the network device, the principle specified for the same service set. The physical layer signaling may be downlink control information, and a special information field in the downlink control information is used to indicate a priority. It may be understood that signaling notified by the network device may be a correspondence between a service set and a specified principle, or may be a principle that needs to be determined.

Optionally, that the terminal device determines the principle specified for the same service set specifically includes: the terminal device determines, based on first higher layer signaling sent by an upper-layer protocol layer of the terminal device to a physical layer of the terminal device, the principle specified for the same service set, where the upper-layer protocol layer is at least one protocol layer of each protocol layer above the physical layer.

Optionally, that the terminal device determines the principle specified for the same service set specifically includes: the terminal device determines, based on predefined information, the principle specified for the same service set.

When the same service set is the first service set, the foregoing principle may be corresponding to the information transmission deadline corresponding to the uplink channel. When the same service set is the first service set, the foregoing principle may be alternatively corresponding to the information transmission latency requirement corresponding to the uplink channel. When the same service set is the first service set, the foregoing principle may be alternatively corresponding to the length of the slot in which the uplink channel is located. When the same service set is the first service set, the foregoing principle may be alternatively corresponding to the length of the mini-slot in which the uplink channel is located.

The first service set includes the URLLC service. When the L uplink channels in the N uplink channels are corresponding to the first service set, the terminal device determines the priorities of the L uplink channels based on the information transmission deadline corresponding to the uplink channel, the information transmission latency requirement corresponding to the uplink channel, the length of the slot in which the uplink channel is located, or the length of the mini-slot in which the uplink channel is located, so that transmit power is preferably transmitted to an uplink channel corresponding to a latency-critical service.

When the same service set is the second service set, the foregoing principle may be corresponding to the quantity of remaining HARQ transmission times of the HARQ process corresponding to the uplink channel. When the same service set is the second service set, the foregoing principle may be alternatively corresponding to the spacing of the subcarrier on which the uplink channel is located. When the same service set is the second service set, the foregoing principle may be alternatively corresponding to the length of the slot in which the uplink channel is located. When the same service set is the second service set, the foregoing principle may be alternatively corresponding to the length of the mini-slot in which the uplink channel is located.

The second service set includes the eMBB service. When the L uplink channels in the N uplink channels are corresponding to the second service set, the terminal device determines the priorities of the L uplink channels based on the quantity of remaining HARQ transmission times of the HARQ process corresponding to the uplink channel, the spacing of the subcarrier on which the uplink channel is located, the length of the slot in which the uplink channel is located, or the length of the mini-slot in which the uplink channel is located, so that transmit power is preferably transmitted to an uplink channel corresponding to an important service or a latency-sensitive service.

When the same service set is the third service set, the foregoing principle may be corresponding to the information sending period corresponding to the uplink channel. When the same service set is the third service set, the foregoing principle may be alternatively corresponding to the spacing of the subcarrier on which the uplink channel is located. When the same service set is the third service set, the foregoing principle may be alternatively corresponding to the length of the slot in which the uplink channel is located. When the same service set is the third service set, the foregoing principle may be alternatively corresponding to the length of the mini-slot in which the uplink channel is located.

The third service set includes the mMTC service. When the L uplink channels in the N uplink channels are corresponding to the third service set, the terminal device determines the priorities of the L uplink channels based on the information sending period corresponding to the uplink channel, the spacing of the subcarrier on which the uplink channel is located, the length of the slot in which the uplink channel is located, or the length of the mini-slot in which the uplink channel is located, so that transmit power is preferably transmitted to an uplink channel corresponding to a relatively important mMTC service.

When the same service set is the fourth service set, the foregoing principle may be corresponding to the information sending period corresponding to the uplink channel. When the same service set is the fourth service set, the foregoing principle may be alternatively corresponding to the spacing of the subcarrier on which the uplink channel is located. When the same service set is the fourth service set, the foregoing principle may be alternatively corresponding to the length of the slot in which the uplink channel is located. When the same service set is the fourth service set, the foregoing principle may be alternatively corresponding to the length of the mini-slot in which the uplink channel is located.

The fourth service set includes the CSI and/or the HARQ information and/or the SR. When the L uplink channels in the N uplink channels are corresponding to the fourth service set, the terminal device determines the priorities of the L uplink channels based on the information sending period corresponding to the uplink channel, the spacing of the subcarrier on which the uplink channel is located, the length of the slot in which the uplink channel is located, or the length of the mini-slot in which the uplink channel is located, so that transmit power is preferably transmitted to an uplink channel corresponding to critical CSI.

Step S22: The terminal device allocates transmit power to at least one of the N uplink channels based on priorities of the N uplink channels, where N is greater than or equal to 2.

In the embodiment shown in FIG. 3, the terminal device determines the principle specified for the same service set. Therefore, when the L uplink channels in the N uplink channels are corresponding to the same service set, the terminal device may determine the priorities of the L uplink channels according to the principle specified for the same service set, so that the terminal device allocates transmit power to at least one of the L uplink channels based on the priorities of the L uplink channels, to preferably allocate transmit power to an important uplink channel.

Figure 4:
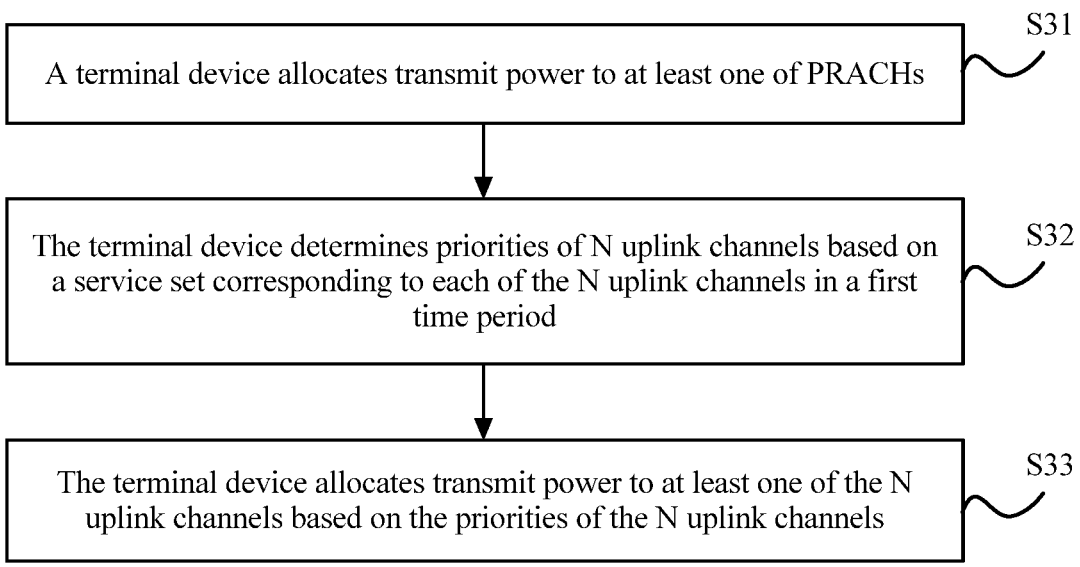
FIG. 4 is a flowchart of still another uplink channel power allocation method according to an embodiment of this application.

FIG. 4 is a flowchart of still another uplink channel power allocation method according to an embodiment of this application. The embodiment shown in FIG. 4 is an embodiment improved based on FIG. 2. For content that is the same as content in FIG. 2, refer to the embodiment shown in FIG. 2. The method shown in FIG. 4 includes the following steps.

Step S31: A terminal device allocates transmit power to at least one of PRACHs.

One or more PRACHs may be included in a first time period. Because the terminal device and a network device may be out of synchronization on a carrier on which the PRACH is located, to ensure that the terminal device and the network device can normally transmit data, the terminal device needs to preferably allocate transmit power to the at least one of the PRACHs. A priority of each of other N uplink channels is lower than a priority of a PRACH. Therefore, transmit power can be allocated to the other N uplink channels only after transmit power is allocated to the at least one PRACH. Further, in a possible case, transmit power can be allocated to the other N uplink channels only after transmit power is allocated to all PRACHs.

Step S32: The terminal device determines priorities of N uplink channels based on a service set corresponding to each of the N uplink channels in a first time period, where each service set is corresponding to one priority, and at least one of service sets corresponding to the N uplink channels includes at least one service.

The terminal device can allocate transmit power to the N uplink channels in the first time period only after the terminal device allocates the transmit power to the at least one of the PRACHs.

Step S33: The terminal device allocates transmit power to at least one of the N uplink channels based on the priorities of the N uplink channels, where N is greater than or equal to 2, and a sum of the transmit power allocated to the at least one uplink channel is less than or equal to transmit power remaining after the allocation to the at least one PRACH.

In the first time period, after the terminal device allocates transmit power to a PRACH, if there is remaining transmit power, the terminal device allocates the transmit power to the at least one of the N uplink channels, where the sum of the transmit power allocated to the at least one uplink channel is less than or equal to the transmit power remaining after the allocation to the at least one PRACH.

In the embodiment shown in FIG. 4, if there is a PRACH in the first time period, it indicates that the terminal device may be out of synchronization on a carrier on which the PRACH is located. Therefore, the terminal device needs to preferably allocate the transmit power to the at least one of the PRACHs. After the transmit power is allocated to the at least one of the PRACHs, if the terminal device has remaining transmit power, the terminal device allocates the transmit power to the at least one of the N uplink channels by using the transmit power remaining after the allocation to the at least one PRACH, to ensure that transmit power is preferably allocated to a PRACH in the first time period.

In a possible implementation, that a terminal device allocates transmit power to at least one of PRACHs may include the following steps: the terminal device first determines a priority of a PRACH based on a service set corresponding to each PRACH; and then the terminal device allocates the transmit power to the at least one of the PRACHs based on the priority of the PRACH.

Each service set is corresponding to one priority. If a PRACH is corresponding to a service set, the terminal device determines a priority of the PRACH based on the service set corresponding to each PRACH, and then allocates the transmit power to the at least one of the PRACHs based on the priority of the PRACH, to ensure that transmit power is preferably allocated to a PRACH in the first time period. It may be understood that a service set corresponding to a PRACH may be determined by using a carrier or a carrier group on which the PRACH is located or a network device, where there is a correspondence between the service set and the carrier or the carrier group on which the PRACH is located or the network device. The correspondence may be prestored, or may be notified by the network device or an upper-layer protocol layer of the terminal device by using higher layer signaling.

In a possible implementation, that a terminal device allocates transmit power to at least one of PRACHs may include the following steps: the terminal device first determines a priority of a PRACH based on a length of a sequence or a length of a slot or a length of a mini-slot corresponding to each PRACH, where a length of each sequence or a length of each slot or a length of each mini-slot is corresponding to one priority; and then the terminal device allocates the transmit power to the at least one of the PRACHs based on the priority of the PRACH.

The length of each sequence or the length of each slot is corresponding to one priority. The terminal device may determine a priority of a PRACH based on the length of the sequence or the length of the slot or the length of the mini-slot corresponding to each PRACH, and then allocate the transmit power to the at least one of the PRACHs based on the priority of the PRACH, to ensure that transmit power is preferably allocated to a PRACH in the first time period. For example, a shorter sequence corresponding to a PRACH indicates a higher priority of the PRACH, a shorter length of a slot corresponding to a PRACH indicates a higher priority of the PRACH, and a shorter length of a mini-slot corresponding to a PRACH indicates a higher priority of the PRACH.

In a possible implementation of this embodiment of this application, that a terminal device allocates transmit power to at least one of PRACHs further includes: if a sum of transmit power of the PRACHs in the first time period is greater than a specified power threshold, the terminal device determines a priority of a PRACH based on a service set or a length of a sequence or a length of a slot or a length of a mini-slot corresponding to the PRACH in the first time period.

In this embodiment of this application, when the sum of the transmit power of the PRACHs in the first time period is greater than the specified power threshold, the terminal device considers preferably allocating transmit power to an important PRACH, and determines a priority of a PRACH based on a service set or a length of a sequence or a length of a slot or a length of a mini-slot corresponding to the PRACH in the first time period. When the sum of the transmit power of the PRACHs in the first time period is less than or equal to the specified power threshold, the terminal device may allocate transmit power to all PRACHs. In this case, the terminal device does not need to consider an important PRACH, that is, the terminal device may directly allocate transmit power to a PRACH without determining a priority of the PRACH.

Figure 5A:
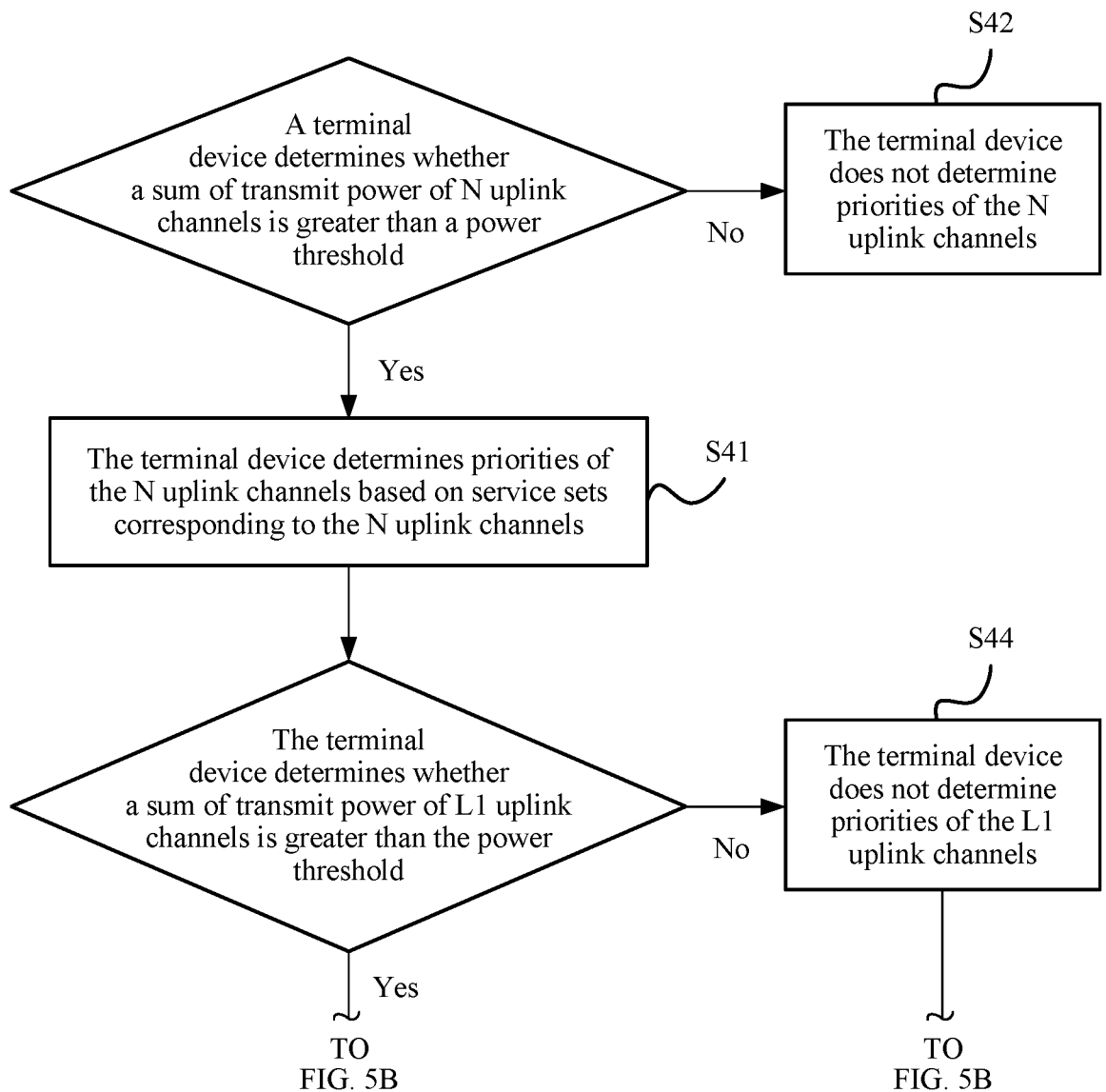
FIG. 5A and FIG. 5B are a flowchart of still another uplink channel power allocation method according to an embodiment of this application.
Figure 5B:
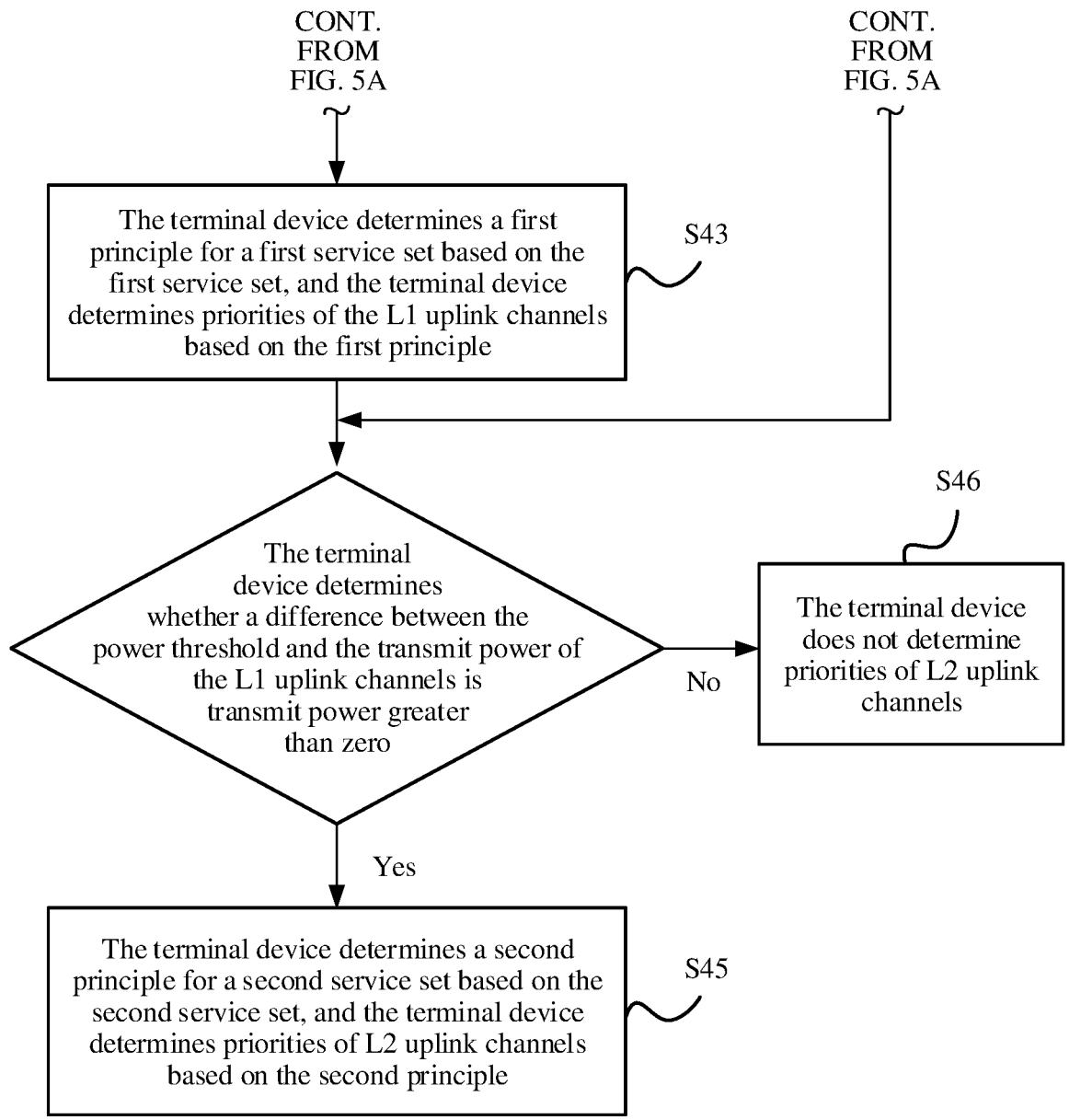

FIG. 5A and FIG. 5B are a flowchart of still another uplink channel power allocation method according to an embodiment of this application. The embodiment shown in FIG. 5A and FIG. 5B is used to describe execution processes of the embodiments shown in FIG. 2 to FIG. 4. For content that is the same as content shown in FIG. 2 to FIG. 4, refer to the embodiments shown in FIG. 2 to FIG. 4. The method shown in FIG. 5A and FIG. 5B includes the following steps.

Step S41: A terminal device determines priorities of N uplink channels based on service sets corresponding to the N uplink channels, where a sum of transmit power of the N uplink channels is greater than a power threshold.

L1 uplink channels in the N uplink channels are corresponding to a first service set, L2 uplink channels in the N uplink channels are corresponding to a second service set, and priorities of the L1 uplink channels are higher than priorities of the L2 uplink channels. For example, the first service set includes a URLLC service, and the second service set includes an eMBB service. It may be understood that the N uplink channels may further include L3 uplink channels corresponding to a third service set and/or L4 uplink channels corresponding to a fourth service set. Herein, L1 and L2 are used as exam pies. For content of the third service set and the fourth service set, refer to the embodiments shown in FIG. 2 to FIG. 4. Details are not described herein again.

Optionally, the terminal device determines priorities of the service sets corresponding to the N uplink channels, and the terminal device determines the priorities of the N uplink channels based on the service sets corresponding to the N uplink channels and the priorities of the service sets, where the sum of the transmit power of the N uplink channels is greater than the power threshold. The terminal device determines, based on information included in a service set, the priorities of the service sets corresponding to the N uplink channels. For example, a priority of URLLC included in a service set is higher than a priority of eMBB included in a service set, a priority of CSI included in a service set is higher than the priority of the eMBB included in the service set, and the priority of the URLLC included in the service set is higher than a priority of mMTC included in a service set.

Step S42: A terminal device does not determine priorities of N uplink channels, where a sum of transmit power of the N uplink channels is less than or equal to a power threshold.

Further, the terminal device directly allocates transmit power to the N uplink channels.

Step S43: The terminal device determines a first principle for a first service set based on the first service set, and the terminal device determines priorities of L1 uplink channels according to the first principle, where a sum of transmit power of the L1 uplink channels is greater than the power threshold.

In a possible implementation of this embodiment of this application, that the terminal device determines a first principle for a first service set based on the first service set, and the terminal device determines priorities of L1 uplink channels according to the first principle further includes: if the sum of the transmit power of the L1 uplink channels in a first time period is greater than the specified power threshold, the terminal device determines the first principle for the first service set based on the first service set corresponding to the L1 uplink channels in the first time period, and the terminal device determines the priorities of the L1 uplink channels according to the first principle.

In this embodiment of this application, when the sum of the transmit power of the L1 uplink channels in the first time period is greater than the specified power threshold, the terminal device considers preferably allocating transmit power to an important uplink channel in the L1 uplink channels, and the terminal device determines the priorities of the L1 uplink channels based on the first service set corresponding to the L1 uplink channels in the first time period. When the sum of the transmit power of the L1 uplink channels in the first time period is less than or equal to the specified power threshold, the terminal device may allocate transmit power to all the L1 uplink channels. In this case, the terminal device does not need to consider an important uplink channel in the L1 uplink channels, that is, the terminal device may directly allocate transmit power to the L1 uplink channels without determining the priorities of the L1 uplink channels.

Step S44: The terminal device does not determine priorities of L1 uplink channels, where a sum of transmit power of the L1 uplink channels is less than or equal to the power threshold.

Further, the terminal device directly allocates transmit power to the L1 uplink channels.

Step S45: The terminal device determines a second principle for a second service set based on the second service set, and the terminal device determines priorities of L2 uplink channels according to the second principle.

If there is remaining power after the transmit power of the L1 uplink channels is allocated, that is, a difference between the power threshold and the sum of the transmit power of the L1 uplink channels is transmit power greater than zero, step S45 is performed.

Further, the terminal device allocates transmit power to at least one of the L2 uplink channels.

Step S46: The terminal device does not determine priorities of L2 uplink channels.

If there is no remaining power after the transmit power of the L1 uplink channels is allocated, that is, a difference between the power threshold and the sum of the transmit power of the L1 uplink channels is transmit power less than or equal to zero, step S46 is performed.

Further, the terminal device does not allocate transmit power to the L2 uplink channels or discards the L2 uplink channels.

The entire execution processes of the embodiments shown in FIG. 2 to FIG. 4 can be clearly understood by using the embodiment shown in FIG. 5A and FIG. 5B.

In the embodiment shown in FIG. 5A and FIG. 5B, step S41 to step S46 are not performed in sequence, but a step that needs to be performed is determined based on a condition in FIG. 5A and FIG. 5B.

In the embodiment shown in FIG. 5A and FIG. 5B, first, the terminal device determines whether the sum of the transmit power of the N uplink channels is greater than the power threshold. If the sum of the transmit power of the N uplink channels is greater than the power threshold, the terminal device determines the priorities of the N uplink channels based on the service sets corresponding to the N uplink channels, where in the N uplink channels, at least the L1 uplink channels are corresponding to the first service set, the L2 uplink channels are corresponding to the second service set, and the priorities of the L1 uplink channels are higher than the priorities of the L2 uplink channels. Otherwise, the terminal device directly allocates power to the N uplink channels without determining the priorities of the N uplink channels. Then, the terminal device determines whether the sum of the transmit power of the L1 uplink channels is greater than the power threshold. If the sum of the transmit power of the N uplink channels is greater than the power threshold, the terminal device determines the first principle for the first service set based on the first service set, and determines the priorities of the L1 uplink channels according to the first principle. Otherwise, the terminal device directly allocates power to the L1 uplink channels without determining the priorities of the L1 uplink channels. Finally, the terminal device determines whether there is remaining power after the allocation to the L1 uplink channels. If there is remaining power, the terminal device determines the second principle for the second service set based on the second service set, and determines the priorities of the L2 uplink channels according to the second principle, and the terminal device allocates the transmit power to the at least one of the L2 uplink channels. Otherwise, the terminal device does not determine the priorities of the L2 uplink channels, and the terminal device does not allocate transmit power to the L2 uplink channels or discards the L2 uplink channels. Therefore, in the embodiment shown in FIG. 5A and FIG. 5B, transmit power can be effectively allocated to an uplink channel.

It should be noted that, that the terminal device determines that the sum of the transmit power of the N uplink channels is greater than the power threshold may be: the terminal device determines that transmit power of all the N uplink channels is greater than the power threshold, or if the terminal device determines that a sum of transmit power of some of the N uplink channels is greater than the power threshold, the terminal device determines that transmit power of all the N uplink channels is greater than the power threshold. That the terminal device determines that the sum of the transmit power of the L1 uplink channels is greater than the power threshold may be: the terminal device determines that transmit power of all the L1 uplink channels is greater than the power threshold, or if the terminal device determines that a sum of transmit power of some of the L1 uplink channels is greater than the power threshold, the terminal device determines that transmit power of all the L1 uplink channels is greater than the power threshold.

Figure 6:
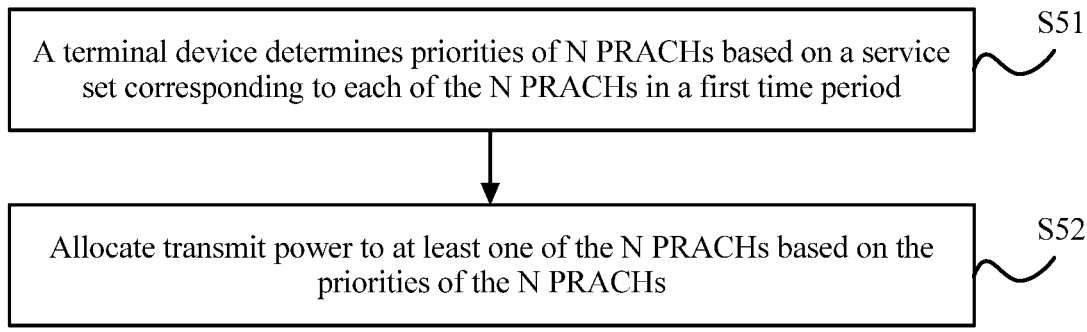
FIG. 6 is a flowchart of still another uplink channel power allocation method according to an embodiment of this application.

FIG. 6 is a flowchart of still another uplink channel power allocation method according to an embodiment of this application. In the uplink channel power allocation method shown in FIG. 6, transmit power can be preferably allocated to an important PRACH. The method includes the following steps.

Step S51: A terminal device determines priorities of N PRACHs based on a service set corresponding to each of the N PRACHs in a first time period, where each service set is corresponding to one priority, and at least one of service sets corresponding to PRACHs includes at least one service.

N is a positive integer greater than or equal to 2. The PRACH is a physical random access channel, and the PRACH is one type of uplink channel.

The N PRACHs may be corresponding to a plurality of service sets. In the plurality of service sets, some service sets include at least one service, but some service sets do not include a service. Each service set is corresponding to one priority. In other words, when one service set includes two services, the two services are corresponding to a same priority.

For example, it is assumed that a first service set includes a URLLC service, a second service set includes an eMBB service, a third service set includes an mMTC service, and a fourth service set includes CSI information. The URLLC service, the eMBB service, and the mMTC service all belong to services, but the CSI information does not belong to a service.

Optionally, the service set includes at least one of the first service set, the second service set, the third service set, and the fourth service set. The first service set includes the URLLC service, the second service set includes the eMBB service, or the eMBB service and a service other than the URLLC, the third service set includes the mMTC service, or the mMTC service and a service other than the URLLC and the eMBB, and the fourth service set includes information that is not corresponding to a service or does not belong to a service, or information that is not corresponding to a service or does not belong to a service and a service other than the URLLC, the eMBB, and the mMTC.

Optionally, a priority corresponding to the first service set is higher than a priority corresponding to the second service set, the priority corresponding to the first service set is higher than a priority corresponding to the third service set, the priority corresponding to the second service set is higher than or equal to the priority corresponding to the third service set, and the priority corresponding to the third service set is higher than a priority corresponding to the fourth service set. For example, the first service set includes only the URLLC service, the second service set includes only the eMBB service, the third service set includes only the mMTC service, and the fourth service set includes only information such as CSI that is not corresponding to a service or does not belong to a service. For another example, the first service set includes the URLLC service, the second service set includes the eMBB service, or the eMBB service and a service other than the URLLC, the third service set includes the mMTC service, or the mMTC service and a service other than the URLLC and the eMBB, and the fourth service set includes information that is not corresponding to a service or does not belong to a service, or information that is not corresponding to a service or does not belong to a service and a service other than the URLLC, the eMBB, and the mMTC.

Optionally, a priority corresponding to the first service set is higher than a priority corresponding to the second service set, the priority corresponding to the second service set is higher than or equal to a priority corresponding to the third service set, and the priority corresponding to the third service set is higher than a priority corresponding to the fourth service set. For example, the first service set includes only the URLLC service, the second service set includes only the eMBB service, the third service set includes only the mMTC service, and the fourth service set includes only information such as CSI that is not corresponding to a service or does not belong to a service. For another example, the first service set includes the URLLC service, the second service set includes the eMBB service, or the eMBB service and a service other than the URLLC, the third service set includes the mMTC service, or the mMTC service and a service other than the URLLC and the eMBB, and the fourth service set includes information that is not corresponding to a service or does not belong to a service, or information that is not corresponding to a service or does not belong to a service and a service other than the URLLC, the eMBB, and the mMTC.

Optionally, a priority corresponding to the first service set is higher than a priority corresponding to the second service set, a priority corresponding to the fourth service set is higher than the priority corresponding to the second service set, and the priority corresponding to the second service set is higher than or equal to a priority corresponding to the third service set. For example, the first service set includes only the URLLC service, the second service set includes only the eMBB service, the third service set includes only the mMTC service, and the fourth service set includes at least one of CSI, a HARQ, and an SR. For another example, the first service set includes the URLLC service, the second service set includes the eMBB service, or the eMBB service and a service other than the URLLC, the third service set includes the mMTC service, or the mMTC service and a service other than the URLLC and the eMBB, and the fourth service set includes at least one of CSI, a HARQ, and an SR.

Each of the N PRACHs in the first time period is corresponding to one service set, and each service set is corresponding to one priority. Therefore, the terminal device may determine the priorities of the N PRACHs based on service sets corresponding to the N PRACHs and the priority corresponding to each service set.

The following describes an execution process of step S51 by using an application example. Referring to Table 5 to Table 7, Table 5 shows a correspondence between N PRACHs and a plurality of service sets, Table 6 shows a correspondence between a plurality of service sets and priorities, and Table 7 shows a correspondence between N PRACHs and priorities.

TABLE 5

| PRACH | Service set |
| --- | --- |
| First PRACH | First service set |
| Second PRACH | Second service set |
| Third PRACH | Third service set |
| Fourth PRACH | Fourth service set |

TABLE 6

| Service set | Priority |
| --- | --- |
| First service set | First priority |
| Second service set | Second priority |
| Third service set | Third priority |
| Fourth service set | Fourth priority |

TABLE 7

| PRACH | Priority |
| --- | --- |
| First PRACH | First priority |
| Second PRACH | Second priority |
| Third PRACH | Third priority |
| Fourth PRACH | Fourth priority |

Refer to the content shown in Table 5 to Table 7. For example, it is assumed that the terminal device has four PRACHs in the first time period: the first PRACH, the second PRACH, the third PRACH, and the fourth PRACH. The terminal device may determine a correspondence between a PRACH and a service set, namely, the content in Table 5. The terminal device may determine that the first PRACH is corresponding to the first service set, the second PRACH is corresponding to the second service set, the third PRACH is corresponding to the third service set, and the fourth PRACH is corresponding to the fourth service set. The terminal device may further determine a priority corresponding to each service set, namely, the content in Table 6. The terminal device may determine that the first service set is corresponding to the first priority, the second service set is corresponding to the second priority, the third service set is corresponding to the third priority, and the fourth service set is corresponding to the fourth priority. In this case, the terminal device may determine a priority of a PRACH based on a correspondence between a PRACH and a service set and a correspondence between a service set and a priority, namely, the content in Table 3. The terminal device may determine that the first PRACH is corresponding to the first priority, the second PRACH is corresponding to the second priority, the third PRACH is corresponding to the third priority, and the fourth PRACH is corresponding to the fourth priority. It should be noted that if the correspondences in Table 5 and Table 6 are predefined, the terminal device may directly obtain content of the entire table without performing determining.

Step S52: Allocate transmit power to at least one of the N PRACHs based on the priorities of the N PRACHs, where N is greater than or equal to 2.

After the terminal device determines the priorities of the N PRACHs, because maximum allowable transmit power of the terminal device may not be enough to allocate transmit power to the N PRACHs in the first time period, the terminal device allocates the transmit power to the at least one of the N PRACHs based on an order of the priorities of the N PRACHs.

For example, it is assumed that the terminal device has four PRACHs in the first time period: a PRACH-A, a PRACH-B, a PRACH-C, and a PRACH-D. In addition, the terminal device has determined that the PRACH-A is corresponding to the first priority, the PRACH-B is corresponding to the second priority, the PRACH-C is corresponding to the third priority, and the PRACH-D is corresponding to the fourth priority. The terminal device allocates transmit power to the four PRACHs based on the priorities of the four PRACHs in the first time period. It is assumed that the first priority is higher than the second priority, the second priority is higher than the third priority, and the third priority is higher than the fourth priority. After the terminal device allocates transmit power to the PRACH-A, if the terminal device has remaining transmit power in the first time period, the terminal device allocates transmit power to the PRACH-B. If the terminal device still has remaining transmit power in the first time period, the terminal device allocates transmit power to the PRACH-C. In this case, if the terminal device has no remaining transmit power in the first time period, the terminal device cannot allocate transmit power to the PRACH-D. In other words, the terminal device allocates transmit power to channels in descending order of priorities until there is no remaining transmit power.

For another example, the terminal device has determined that the PRACH-A is corresponding to the first priority, the PRACH-B and the PRACH-C are corresponding to the second priority, and the PRACH-D is corresponding to the third priority, and the terminal device allocates transmit power to the four PRACHs based on the priorities of the four PRACHs in the first time period. It is assumed that the first priority is higher than the second priority, and the third priority is higher than the second priority. After the terminal device allocates transmit power to the PRACH-A, if there is remaining transmit power, the terminal device allocates power to the PRACH-D. After the power is allocated to the PRACH-D, if remaining transmit power cannot meet all requirements of the PRACH-B and the PRACH-C, the PRACH-B and the PRACH-C are simultaneously compressed, and therefore total transmit power does not exceed a power threshold. The power threshold is the maximum allowable transmit power of the terminal device in the first time period.

In this embodiment of this application shown in FIG. 6, a priority of a PRACH may be determined based on a priority of a service set corresponding to the PRACH. Because a priority of an important service set is high, the terminal device may preferably allocate, based on an order of the priorities of the N PRACHs, transmit power to at least one PRACH corresponding to the important service set, to ensure that transmit power is preferably allocated to a PRACH corresponding to the important service set, thereby meeting a service requirement of a service set.

In a possible implementation of this embodiment of this application, the step in which a terminal device determines priorities of N PRACHs based on a service set corresponding to each of the N PRACHs in a first time period further includes: if a sum of transmit power of the N PRACHs is greater than a specified power threshold, the terminal device determines the priorities of the N PRACHs based on the service set corresponding to each of the N PRACHs in the first time period.

In this embodiment of this application, when the sum of the transmit power of the N PRACHs in the first time period is greater than the specified power threshold, the terminal device considers preferably allocating transmit power to a PRACH corresponding to an important service set, and determines the priorities of the N PRACHs based on the service set corresponding to each of the N PRACHs in the first time period. When the sum of the transmit power of the N PRACHs in the first time period is less than or equal to the specified power threshold, the terminal device may allocate transmit power to the N PRACHs. In this case, the terminal device does not need to consider a PRACH corresponding to an important service set, that is, the terminal device may directly allocate transmit power to the N PRACHs without determining the priorities of the N PRACHs.

In a possible implementation of this embodiment of this application, before the priorities of the N PRACHs are determined, the method in this embodiment of this application may further include the following step: the terminal device determines the service set corresponding to each of the N PRACHs, or the terminal device determines a correspondence between the N PRACHs and service sets.

After the terminal device determines the service set corresponding to each of the N PRACHs, the terminal device can determine the priorities of the N PRACHs based on the service set corresponding to each of the N PRACHs in the first time period.

Optionally, that the terminal device determines the service set corresponding to each of the N PRACHs specifically includes: the terminal device determines, based on received higher layer signaling sent by a network device, the service set corresponding to each of the N PRACHs; or the terminal device determines, based on received physical layer signaling sent by a network device, the service set corresponding to each of the N PRACHs, where the physical layer signaling may be downlink control information, and a special information field in the downlink control information is used to indicate a priority.

Optionally, that the terminal device determines, based on received higher layer signaling, the service set corresponding to each of the N PRACHs specifically includes: the terminal device determines, based on first higher layer signaling sent by an upper-layer protocol layer of the terminal device to a physical layer of the terminal device, the service set corresponding to each of the N PRACHs, where the upper-layer protocol layer is at least one protocol layer of each protocol layer above the physical layer. The upper-layer protocol layer may be specifically at least one of the following protocol layers: a MAC layer, an RLC layer, a PDCP layer, an RRC layer, a NAS layer, and the like.

Optionally, that the terminal device determines the service set corresponding to each of the N PRACHs specifically includes: the terminal device determines, based on pre-defined information, the service set corresponding to each of the N PRACHs.

The predefined information may be a correspondence between a carrier and a service set. For example, a carrier 1 is corresponding to the first service set, and a carrier 2 is corresponding to the second service set. It may be understood that all PRACHs on the carrier 1 are corresponding to the first service set, and all PRACHs on the carrier 2 are corresponding to the second service set.

The predefined information may be alternatively a correspondence between a network device and a service set. For example, a first network device is corresponding to the first service set, a second network device is corresponding to the second service set, the first network device is a primary network device or a primary cell group, and the second network device is a secondary network device or a secondary cell group. It may be understood that all PRACHs sent to the first network device or all PRACHs on the primary cell group are corresponding to the first service set, and all PRACHs sent to the second network device or all PRACHs on the secondary cell group are corresponding to the second service set.

The predefined information may be alternatively a correspondence between a PRACH and a service set. For example, the first PRACH is corresponding to the first service set, and the second PRACH is corresponding to the second service set.

In a possible implementation of this embodiment of this application, that a terminal device determines priorities of N PRACHs based on a service set corresponding to each of the N PRACHs in a first time period includes the following steps: the terminal device determines the priority of each service set; and the terminal device determines the priorities of the N PRACHs based on a priority of the service set corresponding to each of the N PRACHs in the first time period.

The terminal device may specifically determine the priority of each service set in the following manners:

In a first manner, the terminal device may determine the priority of each service set based on a prestored priority of each service set. In a second manner, the terminal device may determine the priority of each service set by using higher layer signaling sent by the upper-layer protocol layer of the terminal device. In a third manner, the terminal device may determine the priority of each service set by using higher layer signaling sent by the network device. In a fourth manner, the terminal device may determine the priority of each service set by using physical layer signaling sent by the network device.

Further, the terminal device may alternatively determine a priority of a service set based on content in the service set. For example, the first service set includes the URLLC service, the second service set includes only a service other than the URLLC, and the third service set includes only the CSI. In this case, the priority of the first service set is higher than that of the second service set, and the priority of the second service set is higher than that of the third service set. Therefore, after determining the priority of each service set, the terminal device determines the priorities of the N PRACHs based on the priority of the service set corresponding to each of the N PRACHs in the first time period.

Figure 7:
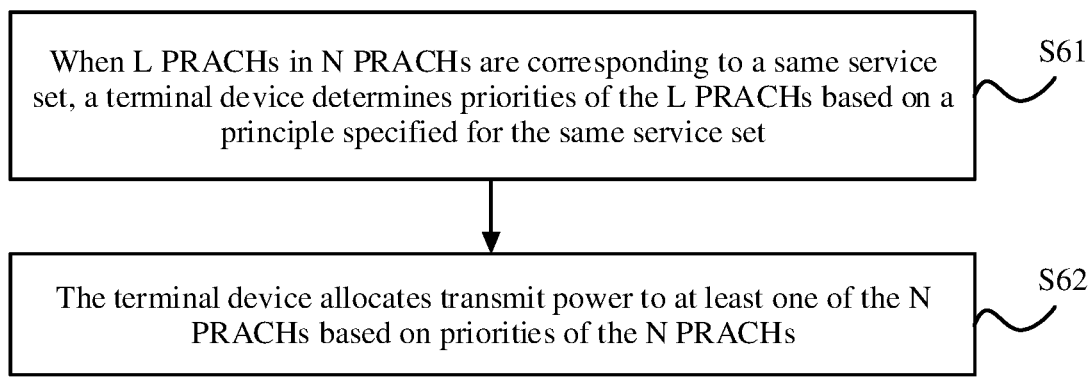
FIG. 7 is a flowchart of still another uplink channel power allocation method according to an embodiment of this application.

FIG. 7 is a flowchart of still another uplink channel power allocation method according to an embodiment of this application. The embodiment shown in FIG. 7 is an embodiment improved based on FIG. 6. For content that is the same as content in FIG. 6, refer to the embodiment shown in FIG. 6. The method shown in FIG. 7 includes the following steps.

Step S61: When L PRACHs in N PRACHs are corresponding to a same service set, a terminal device determines priorities of the L PRACHs according to a principle specified for the same service set, where N is greater than or equal to L, and L is greater than or equal to 2.

That the L PRACHs are corresponding to the same service set means that at least two of the N PRACHs are corresponding to a same service set.

Optionally, that a terminal device determines priorities of the L PRACHs according to a principle specified for the same service set may further specifically include: a sum of transmit power of the L PRACHs is greater than a power threshold. It may be understood that if the sum of the transmit power of the L PRACHs is greater than the power threshold, the terminal device determines the priorities of the L PRACHs. Otherwise, the terminal device directly allocates transmit power to the L PRACHs without determining the priorities of the L PRACHs.

Table 8 shows a correspondence between a PRACH and a service set.

TABLE 8

| PRACH | Service set |
| --- | --- |
| PRACH-J, PRACH-E | First service set |
| PRACH-F, PRACH-G | Second service set |

Refer to Table 8. For example, it is assumed that the terminal device has four PRACHs in the first time period: the PRACH-J, the PRACH-E, the PRACH-F, and the PRACH-G. In the first time period, two PRACHs are corresponding to the first service set, and two PRACHs are corresponding to the second service set.

Because each service set is corresponding to one principle, the terminal device may determine the priorities of the L PRACHs according to the principle corresponding to the service set.

The principle mentioned in step S61 may be at least one of the following: a length of a sequence corresponding to a PRACH, a length of a slot corresponding to a PRACH, and a length of a mini-slot corresponding to a PRACH.

Further, the principle mentioned in step S61 may be at least one of the following:

For information transmission of the same service set, a shorter length of a sequence corresponding to a PRACH indicates a higher priority of the PRACH. If a length of a sequence corresponding to a PRACH is shorter, a transmission time interval (TTI) corresponding to the PRACH is shorter, and it indicates that the PRACH is critical. Therefore, a priority of the PRACH is higher. For example, both the PRACH-J and the PRACH-E need to be sent. A length of a sequence corresponding to the PRACH-J is X, a length of a sequence corresponding to the PRACH-E is Y, and X is less than Y. In this case, a priority of the PRACH-J is higher than that of the PRACH-E.

For information transmission of the same service set, a shorter length of a slot or a shorter length of a mini-slot corresponding to a PRACH indicates a higher priority of the PRACH. In a fifth-generation communications system, a length of a slot or a length of a mini-slot is configurable. If a length of a slot or a length of a mini-slot in which a PRACH is located is shorter, a transmission time granularity is finer, and a network device may transmit information that is more sensitive to a latency or more important information on the PRACH. Therefore, a length of a slot or a length of a mini-slot in which a PRACH is located is set to be shorter, and a priority of the PRACH is higher, so that a PRACH that can bring a latency benefit can be preferably sent, thereby improving system transmission efficiency. For example, both the PRACH-J and the PRACH-E need to be sent. A length of a slot in which the PRACH-J is located is 0.5 ms, and a length of a slot in which the PRACH-E is located is 0.125 ms. In this case, a priority of the PRACH-E is higher than that of the PRACH-J. The slot herein may be a mini-slot, or may include one or more symbols.

Step S62: The terminal device allocates transmit power to at least one of the N PRACHs based on priorities of the N PRACHs, where N is greater than or equal to 2.

In the embodiment shown in FIG. 7, the terminal device determines the principle specified for the same service set. Therefore, when the L PRACHs in the N PRACHs are corresponding to the same service set, the terminal device may determine the priorities of the L PRACHs according to the principle specified for the same service set, so that the terminal device allocates transmit power to at least one of the L PRACHs based on the priorities of the L PRACHs, to preferably allocate transmit power to an important PRACH.

Figure 8:
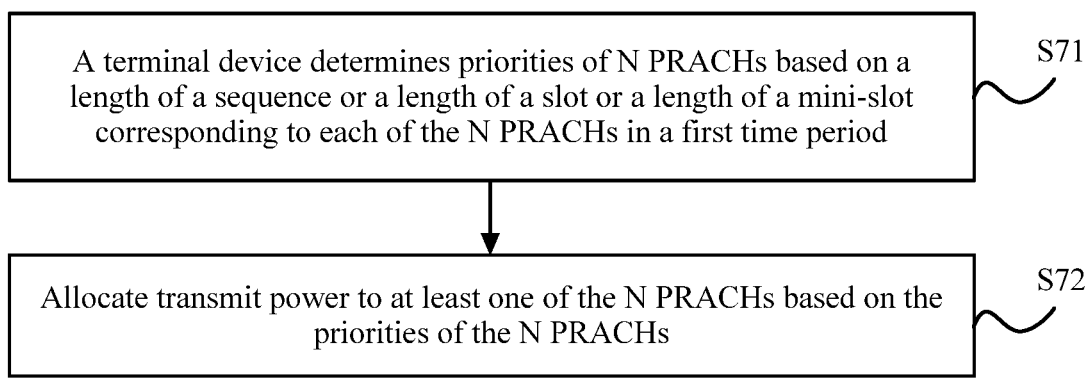
FIG. 8 is a flowchart of still another uplink channel power allocation method according to an embodiment of this application.

FIG. 8 is a flowchart of still another uplink channel power allocation method according to an embodiment of this application. In the uplink channel power allocation method shown in FIG. 8, transmit power can be preferably allocated to an important PRACH channel. The method includes the following steps.

Step S71: A terminal device determines priorities of N PRACHs based on a length of a sequence or a length of a slot or a length of a mini-slot corresponding to each of the N PRACHs in a first time period, where a length of each sequence or a length of each slot is corresponding to one priority.

N is a positive integer greater than or equal to 2. The PRACH is a physical random access channel, and the PRACH is one type of uplink channel.

The terminal device first determines whether a sum of transmit power of the N PRACHs is greater than a specified power threshold. If the terminal device determines that the sum of the transmit power of the N PRACHs is greater than the specified power threshold, the terminal device first determines the length of the sequence or the length of the slot or the length of the mini-slot corresponding to each of the N PRACHs in the first time period, and then the terminal device may determine the priorities of the N PRACHs based on the length of the sequence or the length of the slot or the length of the mini-slot corresponding to each of the N PRACHs in the first time period.

The terminal device may determine the priorities of the N PRACHs in at least the following two manners:

In a first manner, a shorter length of a sequence corresponding to a PRACH indicates a higher priority of the PRACH. If a length of a sequence corresponding to a PRACH is shorter, a TTI corresponding to the PRACH is shorter, and it indicates that the PRACH is critical. Therefore, a priority of the PRACH is higher. For example, both a PRACH-A and a PRACH-B need to be sent. A length of a sequence corresponding to the PRACH-A is X, a length of a sequence corresponding to the PRACH-B is Y, and X is less than Y. In this case, a priority of the PRACH-A is higher than that of the PRACH-B.

In a second manner, a shorter length of a slot or a shorter length of a mini-slot corresponding to a PRACH indicates a higher priority of the PRACH. In a fifth-generation communications system, a length of a slot is configurable. If a length of a slot or a length of a mini-slot in which a PRACH is located is shorter, a transmission time granularity is finer, and a network device may transmit information that is more sensitive to a latency or more important information on the PRACH. Therefore, a length of a slot or a length of a mini-slot in which a PRACH is located is set to be shorter, and a priority of the PRACH is higher, so that a PRACH that can bring a latency benefit can be preferably sent, thereby improving system transmission efficiency. For example, both a PRACH-J and a PRACH-E need to be sent. A length of a slot in which the PRACH-J is located is 0.5 ms, and a length of a slot in which the PRACH-E is located is 0.125 ms. In this case, a priority of the PRACH-E is higher than that of the PRACH-J. The slot herein may be a mini-slot, or may include one or more symbols.

Step S72: Allocate transmit power to at least one of the N PRACHs based on the priorities of the N PRACHs, where N is greater than or equal to 2.

After the terminal device determines the priorities of the N PRACHs, because maximum allowable transmit power of the terminal device may not be enough to allocate transmit power to the N PRACHs in the first time period, the terminal device allocates the transmit power to the at least one of the N PRACHs based on an order of the priorities of the N PRACHs.

For example, it is assumed that the terminal device has four PRACHs in the first time period: a PRACH-A, a PRACH-B, a PRACH-C, and a PRACH-D. In addition, the terminal device has determined that the PRACH-A is corresponding to a first priority, the PRACH-B is corresponding to a second priority, the PRACH-C is corresponding to a third priority, and the PRACH-D is corresponding to a fourth priority. The terminal device allocates transmit power to the four PRACHs based on the priorities of the four PRACHs in the first time period. It is assumed that the first priority is higher than the second priority, the second priority is higher than the third priority, the fourth priority is higher than the second priority, and the first priority is higher than the fourth priority. After the terminal device allocates transmit power to the PRACH-A, if the terminal device has remaining transmit power in the first time period, the terminal device allocates transmit power to the PRACH-D. If the terminal device still has remaining transmit power in the first time period, the terminal device allocates transmit power to the PRACH-B. In this case, if the terminal device has no remaining transmit power in the first time period, the terminal device cannot allocate transmit power to the PRACH-C. In other words, the terminal device allocates transmit power to channels in descending order of priorities until there is no remaining transmit power.

For another example, the terminal device has determined that the PRACH-A is corresponding to a first priority, the PRACH-B and the PRACH-C are corresponding to a second priority, and the PRACH-D is corresponding to a third priority, and the terminal device allocates transmit power to the four PRACHs based on the priorities of the four PRACHs in the first time period. It is assumed that the first priority is higher than the second priority, and the third priority is higher than the second priority. After the terminal device allocates transmit power to the PRACH-A, if the terminal device has remaining transmit power in the first time period, the terminal device allocates transmit power to the PRACH-D. Then, if remaining transmit power cannot meet all requirements of the PRACH-B and the PRACH-C, the PRACH-B and the PRACH-C are simultaneously compressed, and therefore total transmit power does not exceed a power threshold. The power threshold is the maximum allowable transmit power of the terminal device in the first time period.

In the embodiment shown in FIG. 8, a length of each sequence or a length of each slot or a length of each mini-slot is corresponding to one priority. The terminal device may determine the priorities of the N PRACHs based on lengths of sequences or lengths of slots or lengths of mini-slots corresponding to the N PRACHs, and then allocate the transmit power to the at least one of the N PRACHs based on the priorities of the N PRACHs, to ensure that transmit power is preferably allocated to at least one PRACH with a high priority in the first time period.

In a scenario in which N uplink channels of the terminal device in the first time period are corresponding to at least two network devices, for example, the at least two network devices include a first network device and a second network device, if the terminal device allocates all transmit power to an uplink channel corresponding to the first network device in the first time period, the terminal device has no remaining transmit power to be allocated to an uplink channel corresponding to the second network device in the first time period, and the second network device cannot receive, in the first time period, useful information in an uplink channel sent by the terminal device. Consequently, the second network device incorrectly considers useless information such as noise, received in the first time period as the useful information in the uplink channel sent by the terminal device, resulting in an error in a subsequent information demodulation process of the second network device.

Similarly, in a scenario in which N uplink channels of the terminal device in the first time period are corresponding to at least two cell groups, for example, the at least two cell groups include a first cell group and a second cell group, if the terminal device allocates all transmit power to an uplink channel corresponding to the first cell group in the first time period, the terminal device has no remaining transmit power to be allocated to an uplink channel corresponding to the second cell group in the first time period, and useful information in an uplink channel sent by the terminal device cannot be received on the second cell group in the first time period. Consequently, the second cell group incorrectly considers useless information such as noise, received in the first time period as the useful information in the uplink channel sent by the terminal device, resulting in an error in a subsequent information demodulation process of the second cell group.

To resolve a problem that an error occurs in the subsequent information demodulation process of the second network device or the second cell group, an information sending method is provided in the embodiments of this application.

Figure 9:
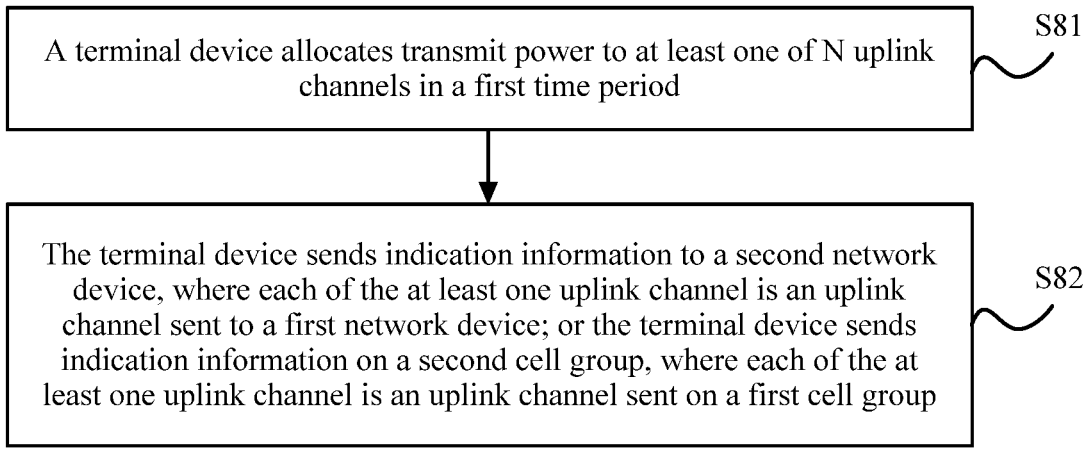
FIG. 9 is a flowchart of an information sending method according to an embodiment of this application.

FIG. 9 is a flowchart of an information sending method according to an embodiment of this application. In the information sending method shown in FIG. 9, a terminal device may send indication information to a network device, so that the network device learns, based on the indication information, that the terminal device sends no uplink channel to the network device in a first time period, or a terminal device may send indication information on a cell group, so that the cell group learns, based on the indication information, that the terminal device sends no uplink channel on the cell group in a first time period, so that the network device or the cell group can properly resolve a case in which no uplink channel is received in the first time period. The method includes the following steps.

Step S81: A terminal device allocates transmit power to at least one of N uplink channels in a first time period.

N is a positive integer greater than or equal to 2. The N uplink channels of the terminal device in the first time period are corresponding to at least two network devices or at least two cell groups, the at least two network devices include at least a first network device and a second network device, and the at least two cell groups include at least a first cell group and a second cell group.

That a terminal device allocates transmit power to at least one of N uplink channels in a first time period may specifically include the following steps: the terminal device first determines priorities of the N uplink channels based on a service set corresponding to each of the N uplink channels in the first time period, where each service set is corresponding to one priority, and at least one of service sets corresponding to the N uplink channels includes at least one service; and then the terminal device allocates the transmit power to the at least one of the N uplink channels based on the priorities of the N uplink channels.

For technical details about the step in which a terminal device allocates transmit power to at least one of N uplink channels in a first time period, refer to the embodiments shown in FIG. 2 to FIG. 5A and FIG. 5B. Details are not described herein again.

Step S82: The terminal device sends indication information to a second network device, where each of the at least one uplink channel is an uplink channel sent to a first network device; or the terminal device sends indication information on a second cell group, where each of the at least one uplink channel is an uplink channel sent on a first cell group.

It may be understood that when each of the at least one uplink channel is an uplink channel sent to the first network device, the terminal device sends the indication information to the second network device; or when each of the at least one uplink channel is an uplink channel sent on the first cell group, the terminal device sends the indication information on the second cell group.

In a scenario in which the N uplink channels of the terminal device in the first time period are corresponding to the at least two network devices, because the at least one uplink channel mentioned in step S82 is all uplink channels sent by the terminal device in the first time period, the terminal device has no remaining transmit power to be allocated to an uplink channel sent to the second network device in the first time period. Therefore, the terminal device needs to send the indication information to the second network device, so that the second network device can learn, based on the indication information, that no uplink channel is received in the first time period.

In a scenario in which the N uplink channels of the terminal device in the first time period are corresponding to the at least two cell groups, because the at least one uplink channel mentioned in step S82 is all uplink channels sent by the terminal device in the first time period, the terminal device has no remaining transmit power to be allocated to an uplink channel on the second cell group in the first time period. Therefore, the terminal device needs to send the indication information to the second cell group, so that the second cell group or a network device corresponding to the second cell group can learn, based on the indication information, that no uplink channel is received in the first time period.

In the scenario in which the N uplink channels of the terminal device in the first time period are corresponding to the at least two network devices, the indication information is information indicating a second time period, the second time period is a sending gap in which the terminal device sends no uplink channel to the second network device, and the second time period includes the first time period.

In the scenario in which the N uplink channels of the terminal device in the first time period are corresponding to the at least two cell groups, the indication information is information indicating a second time period, the second time period is a gap in which the terminal device sends no uplink channel on the second cell group, and the second time period includes the first time period.

It may be understood that the second time period may be greater than or equal to the first time period. If the terminal device sends no uplink channel to the second network device or sends no uplink channel on the second cell group in the first time period, before or after the first time period, the terminal device sends no uplink channel to the second network device or sends no uplink channel on the second cell group in a third time period. The indication information sent by the terminal device may indicate only the first time period, and the second time period is equal to the first time period in this case, or the indication information sent by the terminal device may indicate the first time period and another time period such as the third time period, and the second time period is greater than the first time period in this case.

The gap is a time interval or a time period in which the terminal device sends no information.

Optionally, before the terminal device sends the indication information to the second network device, this embodiment of this application may further include the following step: the terminal device receives first scheduling information sent by the second network device, where the first scheduling information is used to trigger the terminal device to send the at least one of the N uplink channels to the second network device in the first time period.

The second network device sends the first scheduling information to the terminal device in advance, so that the terminal device can send the at least one of the N uplink channels to the second network device in the first time period based on the first scheduling information. After the terminal device receives the first scheduling information sent by the second network device, the terminal device allocates transmit power to at least one uplink channel corresponding to the second network device before the first time period. If a priority of the at least one uplink channel corresponding to the second network device is lower than that of at least one uplink channel corresponding to the first network device, and the terminal device allocates all transmit power to the at least one uplink channel corresponding to the first network device in the first time period, the terminal device has no remaining transmit power to be allocated to an uplink channel corresponding to the second network device in the first time period.

Optionally, before the terminal device sends the indication information on the second cell group, this embodiment of this application may further include the following step: the terminal device receives second scheduling information on the second cell group, where the second scheduling information is used to trigger the terminal device to send the at least one of the N uplink channels on the second cell group in the first time period.

The second cell group sends the second scheduling information to the terminal device in advance, so that the terminal device can send the at least one of the N uplink channels on the second cell group in the first time period based on the second scheduling information. After the terminal device receives the second scheduling information sent by the second cell group, the terminal device allocates transmit power to at least one uplink channel corresponding to the second cell group before the first time period. If a priority of the at least one uplink channel corresponding to the second cell group is lower than that of at least one uplink channel corresponding to the first cell group, and the terminal device allocates all transmit power to the at least one uplink channel corresponding to the first cell group in the first time period, the terminal device has no remaining transmit power to be allocated to an uplink channel corresponding to the second cell group in the first time period.

In the embodiment shown in FIG. 9, in the scenario in which the N uplink channels of the terminal device in the first time period are corresponding to the at least two network devices, when the terminal device determines that each of the at least one uplink channel is an uplink channel sent to the first network device, it indicates that the terminal device has no remaining transmit power to be allocated to an uplink channel corresponding to the second network device in the first time period. Therefore, the terminal device needs to send the indication information to the second network device, so that the second network device can learn, based on the indication information, that the terminal device sends no uplink channel to the second network device in the first time period, and the second network device can properly resolve a case in which no uplink channel is received in the first time period after receiving the indication information. In this way, the second network device does not consider noise in the first time period as an uplink channel sent by the terminal device to the second network device, and a buffer of the second network device avoids being contaminated, and therefore a case in which an uplink channel cannot be successfully received by the second network device after being retransmitted by the terminal device is avoided, thereby improving system resource efficiency.

In the embodiment shown in FIG. 9, in the scenario in which the N uplink channels of the terminal device in the first time period are corresponding to the at least two cell groups, when the terminal device determines that each of the at least one uplink channel is an uplink channel sent on the first cell group, it indicates that the terminal device has no remaining transmit power to be allocated to an uplink channel corresponding to the second cell group in the first time period. Therefore, the terminal device needs to send the indication information on the second cell group, so that the second cell group or the network device corresponding to the second cell group can learn, based on the indication information, that the terminal device sends no uplink channel on the second cell group in the first time period, and the second cell group or the network device corresponding to the second cell group can properly resolve a case in which no uplink channel is received in the first time period after receiving the indication information. In this way, the second cell group or the network device corresponding to the second cell group does not consider noise in the first time period as an uplink channel sent by the terminal device to the second cell group or the network device corresponding to the second cell group, and a case in which a buffer of the second cell group or a buffer of the network device corresponding to the second cell group is contaminated, and consequently an uplink channel cannot be successfully received by the second cell group or the network device corresponding to the second cell group after being retransmitted by the terminal device is avoided, thereby improving system resource efficiency.

Figure 10:
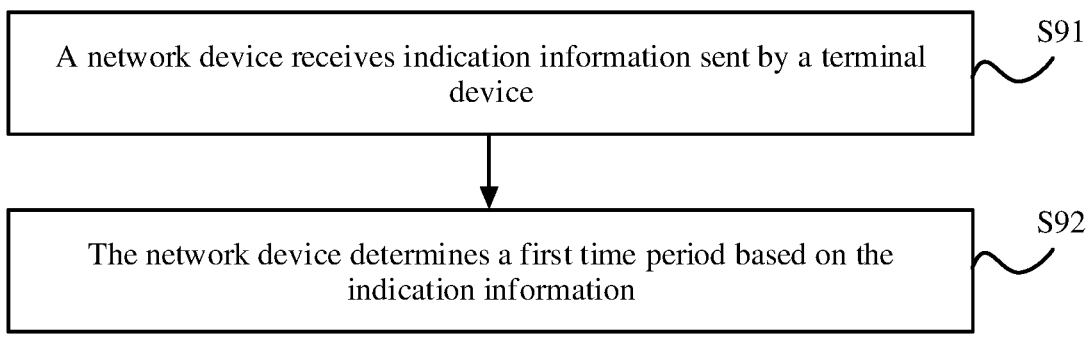
FIG. 10 is a flowchart of still another information sending method according to an embodiment of this application.

FIG. 10 is a flowchart of still another information sending method according to an embodiment of this application. The embodiment shown in FIG. 10 is corresponding to the embodiment shown in FIG. 9. The embodiment shown in FIG. 9 is performed by a terminal device, and the embodiment shown in FIG. 10 is performed by a network device or a cell group. For content in the embodiment shown in FIG. 10 that is the same as content in FIG. 9, refer to the embodiment shown in FIG. 9.

In the information sending method shown in FIG. 10, the network device can learn, based on indication information, that the terminal device sends no uplink channel to the network device in a first time period, or the cell group can learn, based on indication information, that the terminal device sends no uplink channel on the cell group in a first time period, so that the network device or the cell group can properly resolve, based on the indication information, a case in which no uplink channel is received in the first time period. The method shown in FIG. 10 includes the following steps.

Step S91: The network device receives indication information sent by a terminal device.

The indication information is information indicating the first time period. In a scenario in which N uplink channels of the terminal device in the first time period are corresponding to at least two network devices, the first time period is a sending gap in which the terminal device sends no uplink channel to the network device. In a scenario in which N uplink channels of the terminal device in the first time period are corresponding to at least two cell groups, the first time period is a gap in which the terminal device sends no uplink channel on a second cell group.

Step S92: The network device determines the first time period based on the indication information.

After the network device receives the indication information sent by the terminal device, the network device determines the first time period based on the indication information, so that the network device can better process information in the first time period.

In the embodiment shown in FIG. 10, after the network device receives the indication information sent by the terminal device, the network device determines the first time period based on the indication information, so that the network device learns, based on the indication information, that the terminal device sends no uplink channel to the network device in the first time period, or the cell group learns, based on the indication information, that the terminal device sends no uplink channel on the cell group in the first time period, so that the network device or the cell group can properly resolve, based on the indication information, a case in which no uplink channel is received in the first time period.

The network device determines the first time period based on the indication information in a plurality of manners, and several manners are briefly described in the following.

In a first manner, that the network device determines the first time period based on the indication information may include the following step: the network device determines the first time period based on a target time period in the indication information received by the network device.

In the first manner, because the indication information includes a target time period, the network device may determine the first time period based on the target time period.

For example, it is assumed that the target time period included in the indication information is a mini-slot whose identifier is 0 in a subframe 0 or a slot whose identifier is 1 in a subframe 1. The target time period herein is one or more slots or one or more mini-slots.

In a second manner, that the network device determines the first time period based on the indication information may include the following step: the network device determines the first time period based on the indication information received by the network device and a second time period, where the second time period is a time period in which the network device receives the indication information.

In the second manner, when the indication information includes a time offset and/or a time offset direction, the network device may determine the first time period based on the second time period, a relative time period, and the and/or the time offset direction.

Optionally, in a specific manner 1, when the indication information includes the time offset and the time offset direction, the network device may determine the first time period based on the second time period, the time offset direction, and the time offset.

It may be understood that the network device determines the first time period based on the indication information received by the network device and the second time period, where the second time period is the time period in which the network device receives the indication information, and the indication information includes the time offset and the time offset direction.

Optionally, a length of the first time period is predefined or is configured by using higher layer signaling or is notified in the indication information.

For example, it is assumed that the length of the first time period is one mini-slot, and the indication information includes the time offset and the time offset direction. It is assumed that the time offset is three mini-slots, the time offset direction is that the first time period precedes the second time period, and the second time period in which the network device receives the indication information is a mini-slot whose identifier is 7 in a subframe 2. In this case, the network device may determine, based on the time offset, the time offset direction, and the second time period, that the first time period is a mini-slot whose identifier is 4 in the subframe 2.

Optionally, in a specific manner 2, when the indication information includes the time offset, the network device may determine the first time period based on the second time period and the time offset.

It may be understood that the network device determines the first time period based on the indication information received by the network device, a first rule, and the second time period, where the second time period is the time period in which the network device receives the indication information, the indication information includes the time offset, and the first rule is the time offset direction.

Optionally, a length of the first time period is predefined or is configured by using higher layer signaling or is notified in the indication information.

For example, the indication information includes the time offset. It is assumed that the length of the first time period is one mini-slot, the time offset is four mini-slots, and the time offset direction is that the first time period follows the second time period. The first rule may be configured by using higher layer signaling, or may be predefined or prestored. The second time period in which the network device receives the indication information is a mini-slot whose identifier is 1 in a subframe 2. In this case, the network device may determine, based on the time offset, the first rule, and the second time period, that the first time period is a mini-slot whose identifier is 5 in the subframe 2.

Optionally, in a specific manner 3, when the indication information includes the time offset direction, the network device may determine the first time period based on the second time period and the time offset direction.

It may be understood that the network device determines the first time period based on the indication information received by the network device, a first rule, and the second time period, where the second time period is the time period in which the network device receives the indication information, the indication information includes the time offset direction, and the first rule is the time offset and a length.

Optionally, a length of the first time period is predefined or is configured by using higher layer signaling or is notified in the indication information.

For example, the indication information includes the time offset direction, and the time offset direction is that the first time period precedes the second time period. It is assumed that the length of the first time period is two mini-slots, and the time offset is two mini-slots. The first rule may be configured by using higher layer signaling, or may be predefined or prestored. The second time period in which the network device receives the indication information is a mini-slot whose identifier is 0 in a subframe 1. In this case, the network device may determine, based on the time offset direction, the first rule, and the second time period, that the first time period is mini-slots whose identifiers are 26 and 27 in a subframe 0. It is assumed that one subframe includes 28 mini-slots.

Optionally, after step S92, this embodiment of this application may further include the following step: when the first time period precedes the second time period, the network device clears uplink information of the terminal device received in the first time period, where the second time period is the time period in which the network device receives the indication information.

The first time period is a gap in which the terminal device sends no uplink channel on the second cell group or a gap in which the terminal device sends no uplink channel to the network device, and the second time period is the time period in which the network device receives the indication information or a time period in which the network device receives the indication information on the second cell group. If the first time period precedes the second time period, it indicates that the network device incorrectly considers useless information such as noise, received in the first time period as useful information in an uplink channel sent by the terminal device. Therefore, the network device needs to clear the uplink information of the terminal device received in the first time period, that is, the network device clears the useless information such as noise, received in the first time period. In this way, a case in which a buffer of the second cell group or a buffer of the network device corresponding to the second cell group is contaminated, and consequently an uplink channel cannot be successfully received by the second cell group or the network device corresponding to the second cell group after being retransmitted by the terminal device is avoided, thereby improving system resource efficiency.

Optionally, after step S92, this embodiment of this application may further include the following step: when the first time period follows the second time period, the network device skips receiving uplink information of the terminal device in the first time period, where the second time period is the time period in which the network device receives the indication information.

The first time period is a gap in which the terminal device sends no uplink channel on the second cell group or a gap in which the terminal device sends no uplink channel to the network device, and the second time period is the time period in which the network device receives the indication information or a time period in which the network device receives the indication information on the second cell group. If the first time period follows the second time period, it indicates that the network device has not received useless information such as noise in the first time period, and the network device does not incorrectly consider the useless information such as noise, received in the first time period as useful information in an uplink channel sent by the terminal device. Therefore, to prevent the network device from receiving the useless information such as noise in the first time period, the network device may skip receiving the uplink information of the terminal device in the first time period. In this way, a case in which a buffer of the second cell group or a buffer of the network device corresponding to the second cell group is contaminated, and consequently an uplink channel cannot be successfully received by the second cell group or the network device corresponding to the second cell group after being retransmitted by the terminal device is avoided, thereby improving system resource efficiency.

Figure 11:
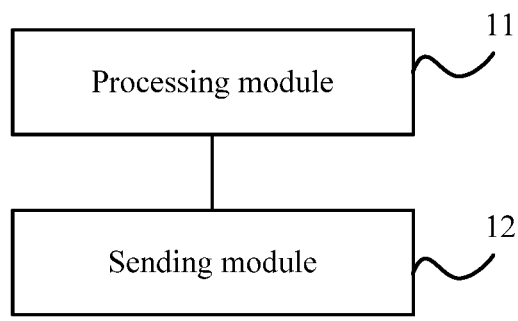
FIG. 11 is a schematic diagram of a terminal device according to an embodiment of this application.

FIG. 11 is a schematic diagram of a terminal device according to an embodiment of this application. FIG. 11 is an apparatus embodiment corresponding to FIG. 2 to FIG. 4. For content in FIG. 11 that is the same as content in FIG. 2 to FIG. 4, refer to the embodiments corresponding to FIG. 2 to FIG. 4. Referring to FIG. 11, the terminal device includes the following modules: a processing module 11, configured to: determine priorities of N uplink channels based on a service set corresponding to each of the N uplink channels in a first time period, where each service set is corresponding to one priority, and at least one of service sets corresponding to the N uplink channels includes at least one service; and allocate transmit power to at least one of the N uplink channels based on the priorities of the N uplink channels, where N is greater than or equal to 2; and a sending module 12, configured to send the at least one uplink channel in the first time period based on the transmit power allocated to the at least one uplink channel.

Optionally, the processing module may be specifically configured to: after determining that a sum of transmit power of the N uplink channels in the first time period is greater than a specified power threshold, determine the priorities of the N uplink channels based on the service set corresponding to each of the N uplink channels in the first time period.

Optionally, the processing module may be further configured to determine the service set corresponding to each of the N uplink channels.

Optionally, the processing module may be specifically configured to: determine the priority of each service set, and determine the priorities of the N uplink channels based on a priority of the service set corresponding to each of the N uplink channels in the first time period.

Optionally, the processing module may be specifically configured to: when L uplink channels in the N uplink channels are corresponding to a same service set, determine priorities of the L uplink channels according to a principle specified for the same service set, where N is greater than or equal to L, and L is greater than or equal to 2.

Optionally, the processing module may be further configured to determine the principle specified for the same service set.

Optionally, one or more physical random access channels PRACHs are further included in the first time period. The processing module may be further configured to allocate transmit power to at least one of the PRACHs. The processing module may be specifically configured to allocate the transmit power to the at least one of the N uplink channels by using transmit power remaining after the allocation to the at least one PRACH.

Optionally, the processing module may be specifically configured to: determine a priority of a PRACH based on a service set corresponding to each PRACH, and allocate the transmit power to the at least one of the PRACHs based on the priority of the PRACH.

Optionally, the processing module may be specifically configured to: determine a priority of a PRACH based on a length of a sequence or a length of a slot corresponding to each PRACH, where a length of each sequence or a length of each slot is corresponding to one priority; and allocate the transmit power to the at least one of the PRACHs based on the priority of the PRACH.

The processing module 11 of the terminal device may be a component such as a processor or a controller, and the sending module 12 of the terminal device may be a component such as a sender or a transmitter.

Figure 12:
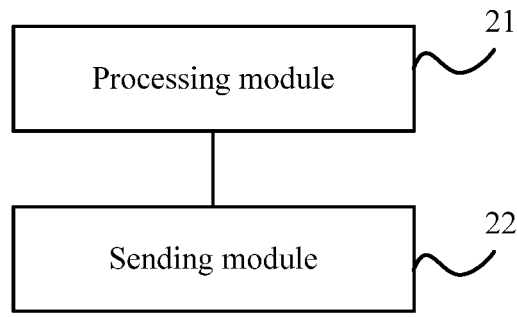
FIG. 12 is a schematic diagram of another terminal device according to an embodiment of this application.

FIG. 12 is a schematic diagram of another terminal device according to an embodiment of this application. FIG. 12 is an apparatus embodiment corresponding to FIG. 6. For content in FIG. 12 that is the same as content in FIG. 6, refer to the embodiment corresponding to FIG. 6. Referring to FIG. 12, the terminal device includes the following modules: a processing module 21, configured to: determine priorities of N PRACHs based on a service set corresponding to each of the N PRACHs in a first time period, where each service set is corresponding to one priority, and at least one of service sets corresponding to PRACHs includes at least one service; and allocate transmit power to at least one of the N PRACHs based on the priorities of the N PRACHs, where N is greater than or equal to 2; and a sending module 22, configured to send the at least one PRACH in the first time period based on the transmit power allocated to the at least one PRACH.

The processing module 21 of the terminal device may be a component such as a processor or a controller, and the sending module 22 of the terminal device may be a component such as a sender or a transmitter.

Figure 13:
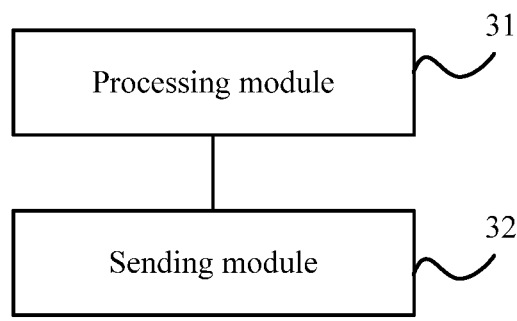
FIG. 13 is a schematic diagram of still another terminal device according to an embodiment of this application.

FIG. 13 is a schematic diagram of still another terminal device according to an embodiment of this application. FIG. 13 is an apparatus embodiment corresponding to FIG. 8. For content in FIG. 13 that is the same as content in FIG. 8, refer to the embodiment corresponding to FIG. 8. Referring to FIG. 13, the terminal device includes the following modules: a processing module 31, configured to: determine priorities of N PRACHs based on a length of a sequence or a length of a slot or a length of a mini-slot corresponding to each of the N PRACHs in a first time period, where a length of each sequence or a length of each slot is corresponding to one priority; and allocate transmit power to at least one of the N PRACHs based on the priorities of the N PRACHs, where N is greater than or equal to 2; and a sending module 32, configured to send the at least one PRACH in the first time period based on the transmit power allocated to the at least one PRACH.

The processing module 31 of the terminal device may be a component such as a processor or a controller, and the sending module 32 of the terminal device may be a component such as a sender or a transmitter.

Figure 14:
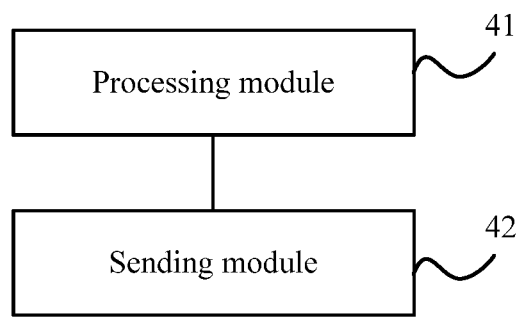
FIG. 14 is a schematic diagram of still another terminal device according to an embodiment of this application.

FIG. 14 is a schematic diagram of still another terminal device according to an embodiment of this application. FIG. 14 is an apparatus embodiment corresponding to FIG. 9. For content in FIG. 14 that is the same as content in FIG. 9, refer to the embodiment corresponding to FIG. 9. Referring to FIG. 14, the terminal device includes the following modules: a processing module 41, configured to allocate transmit power to at least one of N uplink channels in a first time period; and a sending module 42, configured to: send indication information to a second network device, where each of the at least one uplink channel is an uplink channel sent to a first network device; or send indication information on a second cell group, where each of the at least one uplink channel is an uplink channel sent on a first cell group.

N is greater than or equal to 2. The indication information is information indicating a second time period. The second time period is a sending gap in which the terminal device sends no uplink channel to the second network device, or the second time period is a gap in which the terminal device sends no uplink channel on the second cell group, and the second time period includes the first time period.

The N uplink channels of the terminal device in the first time period are corresponding to at least two network devices or at least two cell groups, the at least two network devices include at least the first network device and the second network device, and the at least two cell groups include at least the first cell group and the second cell group.

The processing module 41 of the terminal device may be a component such as a processor or a controller, and the sending module 42 of the terminal device may be a component such as a sender or a transmitter.

Figure 15:
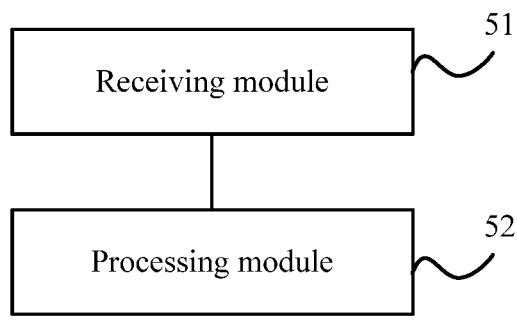
FIG. 15 is a schematic diagram of a network device according to an embodiment of this application.

FIG. 15 is a schematic diagram of a network device according to an embodiment of this application. FIG. 15 is an apparatus embodiment corresponding to FIG. 10. For content in FIG. 15 that is the same as content in FIG. 10, refer to the embodiment corresponding to FIG. 10. Referring to FIG. 15, the network device includes the following modules: a receiving module 51, configured to receive indication information sent by a terminal device, where the indication information is information indicating a first time period, and the first time period is a sending gap in which the terminal device sends no uplink channel to the network device, or the first time period is a gap in which the terminal device sends no uplink channel on a second cell group; and a processing module 52, configured to determine the first time period based on the indication information.

The receiving module 51 of the network device may be a component such as a receiver or a transmitter, and the processing module 52 of the network device may be a component such as a processor or a controller.

Figure 16:
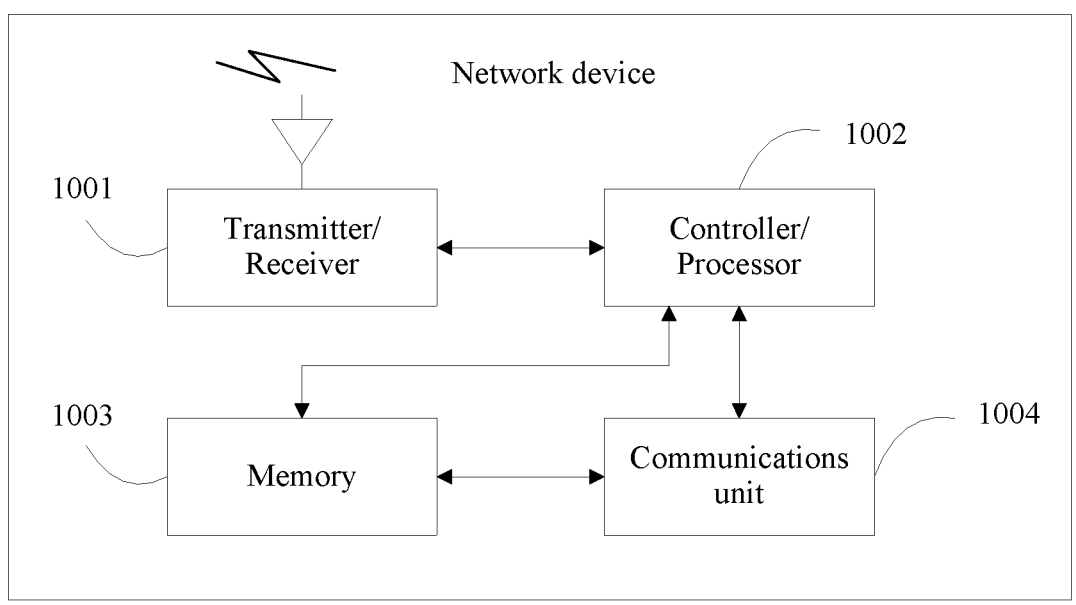
FIG. 16 is a possible schematic structural diagram of a network device according to an embodiment of this application.

FIG. 16 is a possible schematic structural diagram of a network device according to an embodiment of this application. The network device includes a transmitter/receiver 1001, a controller/processor 1002, a memory 1003, and a communications unit 1004. The transmitter/receiver 1001 is configured to support information receiving and sending between the network device and the terminal device in the foregoing embodiments. The controller/processor 1002 performs various functions for communicating with the terminal device.

On an uplink, an uplink signal from the terminal device is received by using an antenna, is demodulated by the receiver 1001, and is further processed by the controller/processor 1102 to restore service data and signaling information that are sent by the terminal device. On a downlink, service data and a signaling message are processed by the controller/processor 1002 and are demodulated by the transmitter 1001 to generate a downlink signal, and the downlink signal is transmitted to the terminal device by using an antenna. The memory 1003 is configured to store program code and data of the network device. The communications unit 1004 is configured to support the network device in communicating with another network entity.

It may be understood that FIG. 16 shows merely a simplified design of the network device. In actual application, the network device may include any quantities of transmitters, receivers, processors, controllers, memories, communications units, and the like.

Figure 17:
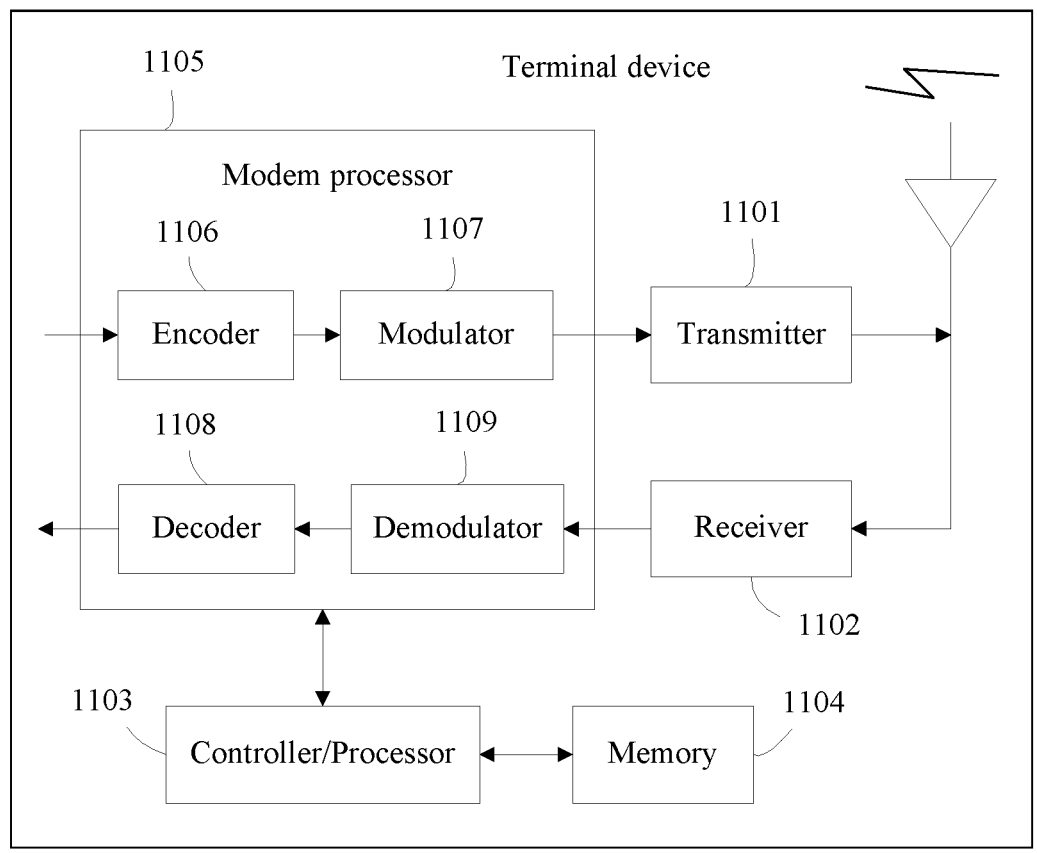
FIG. 17 is a simplified schematic diagram of a possible design structure of a terminal device according to an embodiment of this application.

FIG. 17 is a simplified schematic diagram of a possible design structure of a terminal device according to an embodiment of this application. The terminal device includes a transmitter 1101, a receiver 1102, a controller/processor 1103, a memory 1104, and a modem processor 1105.

The transmitter 1101 adjusts (such as through analog conversion, filtering, amplification, and up-conversion) an output sampling and generates an uplink signal. The uplink signal is transmitted to the network device in the foregoing embodiment by using an antenna. On a downlink, an antenna receives a downlink signal transmitted by the network device in the foregoing embodiment. The receiver 1102 adjusts (such as through filtering, amplification, down-conversion, and digitization) a signal received from the antenna and provides an input sampling. In the modem processor 1105, an encoder 1106 receives service data and a signaling message that are to be sent on an uplink, and processes (such as through formatting, encoding, and interleaving) the service data and the signaling message. A modulator 1107 further processes (such as through symbol mapping and modulation) encoded service data and an encoded signaling message, and provides an output sampling. A demodulator 1109 processes (such as through demodulation) the input sampling and provides symbol estimation. A decoder 1108 processes (such as through de-interleaving and decoding) the symbol estimation and provides decoded data and a decoded signaling message that are to be sent to the terminal device. The encoder 1106, the modulator 1107, the demodulator 1109, and the decoder 1108 may be implemented by the composite modem processor 1105. These units perform processing based on a radio access technology used in a radio access network.

The memory 1104 is configured to store program code and data of the terminal device. The controller/processor 1103 is configured to support the terminal device in performing processes of operations by the terminal device in any one or more uplink channel power allocation methods in the foregoing embodiments.

What is claimed is:

1. An uplink channel power allocation method, wherein the method comprises:
   determining, by a terminal device, priorities of N uplink channels based on a service set corresponding to each of the N uplink channels in a first transmission time period, wherein each service set is corresponding to one priority, and at least one of the service sets corresponding to the N uplink channels comprises at least a first service and a second service, wherein the first service has a first service type different from a second service type of the second service, wherein when L uplink channels in the N uplink channels are corresponding to a same service set, determining, by the terminal device, priorities of the L uplink channels according to a principle specified for the same service set, wherein N is greater than or equal to L, and L is greater than or equal to 2, and wherein the principle is corresponding to at least one of the following:
      an information transmission deadline corresponding to an uplink channel;
      an information transmission latency requirement corresponding to an uplink channel;
      a quantity of remaining hybrid automatic repeat request (HARQ) transmission times of a HARQ process corresponding to an uplink channel;
      a spacing of a subcarrier on which an uplink channel is located;
      a length of a slot in which an uplink channel is located;
      a length of a mini-slot in which an uplink channel is located; or
      an information sending period corresponding to an uplink channel;
   allocating, by the terminal device, transmit power to at least one of the N uplink channels based on the priorities of the N uplink channels, wherein N is greater than or equal to 2; and
   sending, by the terminal device, the at least one uplink channel in the first transmission time period based on the transmit power allocated to the at least one uplink channel.

2. The method according to claim 1, wherein the determining, by a terminal device, priorities of N uplink channels based on a service set corresponding to each of the N uplink channels in a first transmission time period comprises:
   determining, by the terminal device, a priority of each service set; and
   determining, by the terminal device, the priorities of the N uplink channels based on a priority of the service set corresponding to each of the N uplink channels in the first transmission time period.

3. The method according to claim 1, wherein before the determining, by the terminal device, priorities of the L uplink channels according to a principle specified for the same service set, the method further comprises:
   determining, by the terminal device, the principle specified for the same service set.

4. The method according to claim 1, wherein the service set comprises at least one of a first service set, a second service set, a third service set, or a fourth service set;
   the first service set comprises an ultra-reliable and low latency communications (URLLC) service, the second service set comprises an enhanced mobile broadband (eMBB) service, the third service set comprises a massive machine-type communications (mMTC) service, and the fourth service set comprises at least one of channel state information (CSI), a HARQ, and a scheduling request (SR); and
   the principle is at least one of the following according to the same service set:
   when the same service set is the first service set, the principle is corresponding to an information transmission deadline corresponding to the uplink channel, an information transmission latency requirement corresponding to the uplink channel, a length of a slot in which the uplink channel is located, or a length of a mini-slot in which the uplink channel is located;
   when the same service set is the second service set, the principle is corresponding to a quantity of remaining HARQ transmission times of a HARQ process corresponding to the uplink channel, a spacing of a subcarrier on which the uplink channel is located, the length of the slot in which the uplink channel is located, or the length of the mini-slot in which the uplink channel is located;

when the same service set is the third service set, the principle is corresponding to the information sending period corresponding to the uplink channel, the spacing of the subcarrier on which the uplink channel is located, the length of the slot in which the uplink channel is located, or the length of the mini-slot in which the uplink channel is located; or when the same service set is the fourth service set, the principle is corresponding to the information sending period corresponding to the uplink channel, the spacing of the subcarrier on which the uplink channel is located, the length of the slot in which the uplink channel is located, or the length of the mini-slot in which the uplink channel is located.

5. The method according to claim 4, wherein a priority corresponding to the first service set is higher than a priority corresponding to the second service set, and the priority corresponding to the first service set is higher than a priority corresponding to the third service set.

6. The method according to claim 1, wherein the principle is at least one of the following:
   for information transmission of the same service set, an earlier information transmission deadline corresponding to an uplink channel indicates a higher priority of the uplink channel;
   for information transmission of the same service set, a requirement of an uplink channel for a lower information transmission latency indicates a higher priority of the uplink channel;
   for information transmission of the same service set, a smaller quantity of remaining HARQ transmission times of a HARQ process corresponding to an uplink channel indicates a higher priority of the uplink channel;
   for information transmission of the same service set, a larger spacing of a subcarrier on which an uplink channel is located indicates a higher priority of the uplink channel;
   for information transmission of the same service set, a shorter length of a slot in which an uplink channel is located indicates a higher priority of the uplink channel;
   for information transmission of the same service set, a shorter length of a mini-slot in which an uplink channel is located indicates a higher priority of the uplink channel; or
   for information transmission of the same service set, a shorter information sending period corresponding to an uplink channel indicates a higher priority of the uplink channel.

7. The method according to claim 1, wherein one or more physical random access channels (PRACHs) are further comprised in the first transmission time period;
   before the determining priorities of N uplink channels, the method further comprises: allocating, by the terminal device, transmit power to at least one of the PRACHs; and
   the allocating transmit power to at least one of the N uplink channels comprises: allocating the transmit power to the at least one of the N uplink channels by using transmit power remaining after the allocation to the at least one PRACH.

8. The method according to claim 7, wherein
the allocating, by the terminal device, transmit power to at least one of the PRACHs comprises:
determining, by the terminal device, a priority of a PRACH based on a service set corresponding to each PRACH; and
allocating, by the terminal device, the transmit power to the at least one of the PRACHs based on the priority of the PRACH.

9. A terminal device, wherein the terminal device comprises:
   a transmitter; and
   at least one processor;
   a non-transitory computer-readable storage medium storing a program to be executed by the processor, the program including instructions to:
      determine priorities of N uplink channels based on a service set corresponding to each of the N uplink channels in a first transmission time period, wherein each service set is corresponding to one priority, and at least one of the service sets corresponding to the N uplink channels comprises at least a first service and a second service, wherein the first service has a first service type different from a second service type of the second service, wherein when L uplink channels in the N uplink channels are corresponding to a same service set, determine priorities of the L uplink channels according to a principle specified for the same service set, wherein N is greater than or equal to L, and L is greater than or equal to 2, and wherein the principle is corresponding to at least one of the following:
         an information transmission deadline corresponding to an uplink channel;
         an information transmission latency requirement corresponding to an uplink channel;
         a quantity of remaining hybrid automatic repeat request (HARQ) transmission times of a HARQ process corresponding to an uplink channel;
         a spacing of a subcarrier on which an uplink channel is located;
         a length of a slot in which an uplink channel is located;
         a length of a mini-slot in which an uplink channel is located; or
         an information sending period corresponding to an uplink channel;
      allocate transmit power to at least one of the N uplink channels based on the priorities of the N uplink channels, wherein N is greater than or equal to 2; and
      cause the transmitter to send the at least one uplink channel in the first transmission time period based on the transmit power allocated to the at least one uplink channel.

10. The terminal device according to claim 9, wherein the at least one processor is configured to: determine a priority of each service set, and determine the priorities of the N uplink channels based on a priority of the service set corresponding to each of the N uplink channels in the first transmission time period.

11. The terminal device according to claim 9, wherein the at least one processor is further configured to determine the principle specified for the same service set.

12. The terminal device according to claim 9, wherein the service set comprises at least one of a first service set, a second service set, a third service set, or a fourth service set;

the first service set comprises an ultra-reliable and low latency communications (URLLC) service, the second service set comprises an enhanced mobile broadband (eMBB) service, the third service set comprises a massive machine-type communications (mMTC) service, and the fourth service set comprises at least one of channel state information (CSI), a HARQ, and a scheduling request (SR); and the principle is at least one of following according to the same service set:

when the same service set is the first service set, the principle is corresponding to an information transmission deadline corresponding to the uplink channel, an information transmission latency requirement corresponding to the uplink channel, a length of a slot in which the uplink channel is located, or a length of a mini-slot in which the uplink channel is located;

when the same service set is the second service set, the principle is corresponding to a quantity of remaining HARQ transmission times of a HARQ process corresponding to the uplink channel, a spacing of a subcarrier on which the uplink channel is located, the length of the slot in which the uplink channel is located, or the length of the mini-slot in which the uplink channel is located;

when the same service set is the third service set, the principle is corresponding to the information sending period corresponding to the uplink channel, the spacing of the subcarrier on which the uplink channel is located, the length of the slot in which the uplink channel is located, or the length of the mini-slot in which the uplink channel is located; or when the same service set is the fourth service set, the principle is corresponding to the information sending period corresponding to the uplink channel, the spacing of the subcarrier on which the uplink channel is located, the length of the slot in which the uplink channel is located, or the length of the mini-slot in which the uplink channel is located.

13. The terminal device according to claim 12, wherein a priority corresponding to the first service set is higher than a priority corresponding to the second service set, and the priority corresponding to the first service set is higher than a priority corresponding to the third service set.

14. The terminal device according to claim 9, wherein the principle is at least one of the following:

for information transmission of the same service set, an earlier information transmission deadline corresponding to an uplink channel indicates a higher priority of the uplink channel;

for information transmission of the same service set, a requirement of an uplink channel for a lower information transmission latency indicates a higher priority of the uplink channel;

for information transmission of the same service set, a smaller quantity of remaining HARQ transmission times of a HARQ process corresponding to an uplink channel indicates a higher priority of the uplink channel;

for information transmission of the same service set, a larger spacing of a subcarrier on which an uplink channel is located indicates a higher priority of the uplink channel;

for information transmission of the same service set, a shorter length of a slot in which an uplink channel is located indicates a higher priority of the uplink channel;

for information transmission of the same service set, a shorter length of a mini-slot in which an uplink channel is located indicates a higher priority of the uplink channel; or for information transmission of the same service set, a shorter information sending period corresponding to an uplink channel indicates a higher priority of the uplink channel.

15. The terminal device according to claim 9, wherein one or more physical random access channels (PRACHs) are further comprised in the first transmission time period;

the at least one processor is further configured to allocate transmit power to at least one of the PRACHs; and the at least one processor is configured to allocate the transmit power to the at least one of the N uplink channels by using transmit power remaining after the allocation to the at least one PRACH.

16. The terminal device according to claim 15, wherein the at least one processor is configured to: determine a priority of a PRACH based on a service set corresponding to each PRACH, and allocate the transmit power to the at least one of the PRACHs based on the priority of the PRACH.

17. A non-transitory computer-readable storage medium storing a program to be executed by at least one processor, the program including instructions to:

determine priorities of N uplink channels based on a service set corresponding to each of the N uplink channels in a first transmission time period, wherein each service set is corresponding to one priority, and at least one of the service sets corresponding to the N uplink channels comprises at least a first service and a second service, wherein the first service has a first service type different from a second service type of the second service, wherein when L uplink channels in the N uplink channels are corresponding to a same service set;

determine priorities of the L uplink channels according to a principle specified for the same service set, wherein N is greater than or equal to L, and L is greater than or equal to 2, and wherein the principle is corresponding to at least one of the following:

an information transmission deadline corresponding to an uplink channel;

an information transmission latency requirement corresponding to an uplink channel;

a quantity of remaining hybrid automatic repeat request (HARQ) transmission times of a HARQ process corresponding to an uplink channel;

a spacing of a subcarrier on which an uplink channel is located;

a length of a slot in which an uplink channel is located;

a length of a mini-slot in which an uplink channel is located; or an information sending period corresponding to an uplink channel;

allocate transmit power to at least one of the N uplink channels based on the priorities of the N uplink channels, wherein N is greater than or equal to 2; and send the at least one uplink channel in the first transmission time period based on the transmit power allocated to the at least one uplink channel.

18. The non-transitory computer-readable storage medium according to claim 17, wherein when the program further includes instructions to:

determine a priority of each service set; and
determine the priorities of the N uplink channels based on a priority of the service set corresponding to each of the N uplink channels in the first transmission time period.

19. The non-transitory computer-readable storage medium according to claim 17, wherein the at least one processor is further configured to determine the principle specified for the same service set.

20. The non-transitory computer-readable storage medium according to claim 17, wherein the service set comprises at least one of a first service set, a second service set, a third service set, or a fourth service set;
the first service set comprises an ultra-reliable and low latency communications (URLLC) service, the second service set comprises an enhanced mobile broadband (eMBB) service, the third service set comprises a massive machine-type communications (mMTC) service, and the fourth service set comprises at least one of channel state information (CSI), a HARQ, and a scheduling request (SR); and
the principle is at least one of following according to the same service set:
when the same service set is the first service set, the principle is corresponding to an information transmission deadline corresponding to the uplink channel, an information transmission latency requirement corresponding to the uplink channel, a length of a slot in which the uplink channel is located, or a length of a mini-slot in which the uplink channel is located;
when the same service set is the second service set, the principle is corresponding to a quantity of remaining HARQ transmission times of a HARQ process corresponding to the uplink channel, a spacing of a subcarrier on which the uplink channel is located, the length of the slot in which the uplink channel is located, or the length of the mini-slot in which the uplink channel is located;
when the same service set is the third service set, the principle is corresponding to the information sending period corresponding to the uplink channel, the spacing of the subcarrier on which the uplink channel is located, the length of the slot in which the uplink channel is located, or the length of the mini-slot in which the uplink channel is located; or
when the same service set is the fourth service set, the principle is corresponding to the information sending period corresponding to the uplink channel, the spacing of the subcarrier on which the uplink channel is located, the length of the slot in which the uplink channel is located, or the length of the mini-slot in which the uplink channel is located.

* * * * *